(12) United States Patent
Umeya

(10) Patent No.: US 7,206,130 B2
(45) Date of Patent: Apr. 17, 2007

(54) PROJECTION SCREEN AND PROJECTION SYSTEM COMPRISING THE SAME

(75) Inventor: Masanori Umeya, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 292 days.

(21) Appl. No.: 10/954,351

(22) Filed: Oct. 1, 2004

(65) Prior Publication Data

US 2005/0152031 A1 Jul. 14, 2005

(30) Foreign Application Priority Data

Oct. 3, 2003 (JP) ............... 2003-345966

(51) Int. Cl.
G03B 21/56 (2006.01)
G02B 5/30 (2006.01)
G02B 27/28 (2006.01)
G02F 1/1335 (2006.01)
C09K 19/02 (2006.01)

(52) U.S. Cl. .............. 359/459; 359/449; 359/487; 359/492; 359/452; 349/87; 349/96; 349/176; 349/185

(58) Field of Classification Search ............... 359/459, 359/449, 454, 487, 352, 465, 492, 452; 349/87, 349/96, 176, 185
See application file for complete search history.

(56) References Cited

U.S. PATENT DOCUMENTS 6,381,068 B1 * 4/2002 Harada et al. ............... 359/443
2003/0038918 A1 * 2/2003 Kashima et al. ............ 349/194
2005/0041285 A1 * 2/2005 Umeya ....................... 359/449

FOREIGN PATENT DOCUMENTS

| EP | 0 648 048 A1 | | 10/1994 |
|---|---|---|---|
| EP | 1046934 A1 | * | 10/2000 |
| EP | 1286189 A2 | * | 2/2003 |
| JP | 05-107660 | | 4/1993 |
| JP | 06082747 A | * | 3/1994 |
| JP | 02-540445 | | 11/2002 |

OTHER PUBLICATIONS

"Bragg Reflection From Cholesteric Liquid Crystals," W.D. St. John, et al., Physical review E, vol. 51, No. 2, Feb. 1, 1995, pp. 1191-1198.
"Optical Properties of Diffusion-Type Cholesteric Liquid Crystalline Polymer Film," A. Shiozawa et al., Molecular and Liquid Crystals, vol. 364, 2001, pp. 464-478.

* cited by examiner

Primary Examiner—W. B. Perkey
Assistant Examiner—Magda Cruz
(74) Attorney, Agent, or Firm—Oliff & Berridge, PLC

(57) ABSTRACT

A projection screen for displaying an image by reflecting imaging light projected from a projector, including a substrate and a projected-image-receiving layer formed on the substrate. The projected-image-receiving layer has the function of selectively reflecting a specific polarized-light component and the function of diffusing the specific polarized-light component. Further, the projected-image-receiving layer includes two or more selective reflection layers having different reflection wave ranges, and, of these selective reflection layers, the selective reflection layer having a reflection wave range covering the shorter wavelength side is situated apart from the observation side as compared with the selective reflection layer having a reflection wave range covering the longer wavelength side.

18 Claims, 3 Drawing Sheets

PROJECTION SCREEN AND PROJECTION SYSTEM COMPRISING THE SAME

BACKGROUND OF THE INVENTION

1. Field of the Invention

The present invention relates to a projection system in which imaging light emitted from a projector is projected on a projection screen to produce thereon an image. More particularly, the present invention relates to a projection screen capable of sharply displaying an image and of providing high image visibility, and to a projection system comprising such a projection screen.

2. Background Art

Conventional projection systems for business and home uses are as follows: imaging light such as an image emitted from a projector is projected on a projection screen, and viewers observe the light reflected from the projection screen as an image. In such conventional projection systems, a projection screen comprising a transparent medium in which transparent or semitransparent, porous, finely divided particles are dispersed and a reflecting member provided at the rear of this transparent medium is used, for example.

However, it is difficult for such a conventional projection screen to show good image display performance under bright environmental light because it reflects not only imaging light but also environmental light such as sunlight and light from lighting fixtures.

In a conventional projection system, differences in the intensity of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

However, since the above-described conventional projection screen reflects both imaging light and environmental light such as sunlight and light from lighting fixtures without distinction, both the white- and black-indication parts get lighter, and differences in brightness between white and black become small. For this reason, it has not been easy for the conventional projection screen to provide good image display unless the influence of environmental light, such as sunlight and light from lighting fixtures, on the projection screen is suppressed by using a means for shading a room, or by placing the projection screen in a dark environment.

Under these circumstances, studies have been made on projection screens capable of showing good image display performance even under bright environmental light. There have so far been proposed projection screens using, for example, holograms or polarized-light-separating layers (see Japanese Laid-Open Patent Publications No. 107660/1993 (Patent Document 1) and No. 540445/2002 (Patent Document 2)).

Of these conventional projection screens, those ones using holograms have the advantage that the white-indication part can be made lighter if their light-scattering effect is properly controlled, so that they can show relatively good image display performance even under bright environment light. However, holograms have wavelength selectivity but no polarization selectivity, so that the projection screens using holograms can display images only with limited sharpness. Moreover, because of production problems, it is difficult to produce large-sized projection screens by making use of holograms.

On the other hand, on the above-described conventional projection screens using polarized-light-separating layers, it is possible to make the white-indication part lighter and the black-indication part darker. Therefore, these projection screens can sharply display images even under bright environmental light as compared with the projection screens using holograms.

Specifically, Patent Document 1 describes a projection screen for which a cholesteric liquid crystal that reflects red, green and blue light (right- or left-handed circularly polarized light) contained in imaging light is used in order to make the projection screen not reflect nearly half the environmental light incident on the screen, by making use of the circularly-polarized-light-separating property of the cholesteric liquid crystal.

However, in the projection screen described in Patent Document 1, since the cholesteric liquid crystal is in the state of planar orientation, specular reflection occurs when the cholesteric liquid crystal reflects light, which makes it difficult to recognize the reflected light as an image. Namely, to recognize the reflected light as an image, it is necessary that the reflected light be scattered. However, Patent Document 1 is quite silent on this point.

On the other hand, Patent Document 2 describes a projection screen using, as a reflective polarization element, a multi-layered reflective polarizer or the like, having diffusing properties. This projection screen does not reflect part of the environmental light incident on it because of the polarized-light-separating property of the multi-layered reflective polarizer or the like, and scatters the reflected light by interfacial reflection that occurs at an interface between materials having different refractive indices, constituting the multi-layered reflective polarizer, or by means of a diffusing element that is provided separately from the multi-layered reflective polarizer. Further, Patent Document 2 describes a projection screen using a cholesteric, reflective polarizer or the like as a reflective polarization element in combination with a diffusing element. This projection screen does not reflect part of the environmental light incident on it because of the polarized-light-separating property of the cholesteric, reflective polarizer or the like, and scatters the reflected light by means of the diffusing element that is provided separately from the cholesteric, reflective polarizer.

Namely, the projection screen described in Patent Document 2 is made to selectively diffuse-reflect only a specific polarized component of the imaging light projected from a projector by making use of the so-called polarized-light-separating property so that the projection screen sharply displays an image, and is also made to scatter the reflected imaging light so that the projection screen provides improved image visibility.

However, in the projection screens described in Patent Documents 1 and 2, reduction of light reflection efficiency that occurs on the polarized-light separating layers for use in these projection screens is neglected. Namely, the polarized-light separating layer for use in such a projection screen is often a laminate of a plurality of selective reflection layers having different reflection wave ranges that cover the wave ranges for red (R), green (G) and blue (B) colors, the three primary colors of light. If the polarized-light separating layer is such a laminate, the state of polarization of light that has entered the polarized-light separating layer from the observation side is disturbed while the light is traveling toward the opposite side. Therefore, the light reflection efficiency of the selective reflection layer situated apart from the observation side becomes lower than that of the selective reflection layer situated closer to the observation side.

In order that the selective reflection layers constituting the above polarized-light separating layer can have the same light reflection efficiency, it is necessary to make the selective reflection layers different in thickness so that the selective reflection layer situated more distant from the observation side has a greater thickness. In this case, a greater increment in thickness is needed for the selective reflection layer whose reflection wave range covers the longer wavelength side. Therefore, for example, if the selective reflection layer having a reflection wave range covering the longer wavelength side is positioned apart from the observation side, this layer inevitably has an excessively great thickness. As a result, the polarized-light separating layer, as a whole, is to have a thickness greater than needed, and the function of selectively reflecting light possessed by the polarized-light separating layer is impaired.

SUMMARY OF THE INVENTION

The present invention has been accomplished in the light of the above-described problem in the related art. An object of the present invention is, therefore, to provide a projection screen capable of sharply displaying an image with increased brightness even under bright environmental light, and a projection system comprising such a projection screen.

A projection screen of the present invention, for displaying an image by reflecting imaging light that is projected from the observation side, comprises a projected-image-receiving layer having the function of selectively reflecting a specific polarized-light component and the function of diffusing the specific polarized-light component, wherein the projected-image-receiving layer includes two or more selective reflection layers having the function of selectively reflecting the specific polarized-light component, the two or more selective reflection layers have different reflection wave ranges, and, of the two or more selective reflection layers, the selective reflection layer having a reflection wave range covering the shorter wavelength side is situated apart from the observation side as compared with the selective reflection layer having a reflection wave range covering the longer wavelength side.

In the above-described projection screen according to the present invention, the value obtained by dividing the thickness of each selective reflection layer in the projected-image-receiving layer by the center wavelength of the reflection wave range thereof, the center wavelength being determined on the assumption that light enters the selective reflection layer vertically to it, preferably fulfills the requirement that this value obtained in terms of the selective reflection layer having a reflection wave range covering the shorter wavelength side is greater than that obtained in terms of the selective reflection layer having a reflection wave range covering the longer wavelength side.

Further, in the above-described projection screen according to the present invention, it is preferable that the two or more selective reflection layers in the projected-image-receiving layer are a selective reflection layer having a reflection wave range with a center wavelength of 430 to 460 nm, a selective reflection layer having a reflection wave range with a center wavelength of 540 to 570 nm, and a selective reflection layer having a reflection wave range with a center wavelength of 580 to 620 nm, provided that light enters the projected-image-receiving layer vertically to it.

Furthermore, in the above-described projection screen according to the present invention, it is preferable that the specific polarized-light component be right- or left-handed circularly polarized light. The specific polarized-light component may also be linearly polarized light of one vibration direction.

Furthermore, in the above-described projection screen according to the present invention, it is preferable that the projected-image-receiving layer further includes, in addition to the two or more selective reflection layers having the function of selectively reflecting the specific polarized-light component, a diffusing layer having the function of diffusing the specific polarized-light component. Alternatively, each selective reflection layer in the projected-image-receiving layer may have, in addition to the function of selectively reflecting the specific polarized-light component, the function of diffusing the specific polarized-light component.

Furthermore, in the projection screen according to the present invention, it is preferable that each selective reflection layer in the projected-image-receiving layer has a cholesteric liquid crystalline structure and, owing to structural non-uniformity in the cholesteric liquid crystalline structure, diffuses the specific polarized-light component.

Furthermore, it is preferable that the projection screen according to the present invention further comprises a substrate that supports the projected-image-receiving layer. In this case, the substrate may be an absorptive substrate containing a light-absorbing layer capable of absorbing light in the visible region, or a transparent substrate capable of transmitting at least part of light in the visible region.

Furthermore, it is preferable that the projection screen according to the present invention further comprises an intermediate layer having a barrier property or an adhesion property, provided between each neighboring two of the selective reflection layers in the projected-image-receiving layer.

Furthermore, it is preferable that the projection screen according to the present invention further comprises a functional layer containing at least one layer selected from the group consisting of a hard coat layer, an anti-glaring layer, an anti-reflection layer, an ultraviolet-light-absorbing layer, and an antistatic layer. In this case, the functional layer is preferably an anti-glaring layer, and this anti-glaring layer is preferably composed of a layer with an irregularly roughened surface, isotropic with respect to refractive index. For example, a TAC film with a matte surface is conveniently used as the anti-glaring layer. Alternatively, the projected-image-receiving layer may have, on the side on which imaging light is projected, a roughened surface by which the anti-glaring property is imparted to the projected-image-receiving layer.

A projection system according to the present invention comprises: the above-described projection screen according to the present invention; and a projector that projects imaging light on the projection screen.

According to the present invention, since the projected-image-receiving layer has the function of selectively reflecting a specific polarized-light component, this layer does not reflect light other than the specific polarized-light component and absorbs almost all of the light. For this reason, even when environmental light such as sunlight and light from lighting fixtures is present, the projection screen is not so affected by the environmental light and can display an image with high contrast and high color purity. Further, according to the present invention, since the projected-image-receiving layer has the function of diffusing the specific polarized-light component, the specific polarized-light component is diffused when reflected from the projected-image-receiving layer. Therefore, the projection screen can provide high image visibility. Furthermore, according to the present invention, it is possible to produce a highly visible image without providing an anti-glaring layer or the like with a roughened (matte) surface, so that there can be obtained a projection screen capable of producing a sharp, non-coarse image.

In the present invention, the projected-image-receiving layer includes two or more selective reflection layers having different reflection wave ranges. When light enters the projection screen comprising such a projected-image-receiving layer, the selective reflection layer situated apart from the observation (the plane of incidence) side (in the case where the selective reflection layers are formed on a substrate, the selective reflection layer situated on the substrate side) reflects light with lower efficiency. This is because, while light that has obliquely entered one selective reflection layer in the projected-image-receiving layer from the observation side is travelling toward the opposite side to reach another selective reflection layer situated apart from the observation side, the state of polarization of the light is disturbed because of the phase difference between the two selective reflection layers, and so forth. In order to increase the light reflection efficiency of the selective reflection layer situated apart from the observation side, it is necessary to make the thickness of this selective reflection layer greater. However, when this selective reflection layer has an excessively great thickness, and, as a result, the overall thickness of the projected-image-receiving layer becomes greater than needed, the function of selectively reflecting a specific polarized-light component and the resistance to bending that are possessed by the projected-image-receiving layer are impaired.

To avoid the above problem, of the two or more selective reflection layers constituting the projected-image-receiving layer, the selective reflection layer having a reflection wave range covering the shorter wavelength side is positioned apart from the observation side as compared with the selective reflection layer having a reflection wave range covering the longer wavelength side.

A layer having the function of selectively reflecting a specific polarized-light component, typically a cholesteric liquid crystalline layer, usually has a selective reflection wave range that is proportional to its thickness if the light reflection efficiency is fixed. For this reason, when the light reflection efficiency is fixed, a selective reflection layer having a reflection wave range covering the shorter wavelength side has a smaller thickness, and a selective reflection layer having a reflection wave range covering the longer wavelength side, a greater thickness. Also for the same reason, the increment in thickness required to increase light reflection efficiency is smaller for a selective reflection layer having a reflection wave range covering the shorter wavelength side and greater for a selective reflection layer having a reflection wave range covering the longer wavelength side. Therefore, in the case where the thickness of each selective reflection layer is controlled so that all of the selective reflection layers have the same reflection efficiency, the overall thickness of the projected-image-receiving layer is smaller when the selective reflection layers are successively laminated, the selective reflection layer to be situated most distant from the observation side being firstly formed, in such a manner that their reflection wave ranges successively covers from the shorter to longer wavelength side, than when the selective reflection layers are successively laminated, the selective reflection layer to be situated most distant from the observation side being firstly formed, in such a manner that their reflection wave ranges successively covers from the longer to shorter wavelength side.

Namely, in the case where the selective reflection layer having a reflection wave range covering the shorter wavelength side is provided apart from the observation side as compared with the selective reflection layer having a reflection wave range covering the longer wavelength side, the selective reflection layer whose light reflection efficiency is needed to be increased (the selective reflection layer situated apart from the observation side) has a reflection wave range covering the shorter wavelength side, and the increment in thickness required to increase light reflection efficiency is small. Therefore, when the light reflection efficiency of such a selective reflection layer is controlled by increasing the thickness of this layer, the resulting selective reflection layer can show sufficiently high light reflection efficiency even if its thickness is relatively small. For this reason, the projected-image-receiving layer is prevented from having an overall thickness greater than needed, and it is thus possible to obtain a projection screen excellent in the property of selectively reflecting light.

In the present invention, the value obtained by dividing the thickness of each selective reflection layer in the projected-image-receiving layer by the center wavelength of the reflection wave range thereof, the center wavelength being determined on the assumption that light enters the selective reflection layer vertically to it, preferably fulfills the requirement that this value obtained in terms of the selective reflection layer having a reflection wave range covering the shorter wavelength side is greater than that obtained in terms of the selective reflection layer having a reflection wave range covering the longer wavelength side. If this requirement is fulfilled, the selective reflection layer situated apart from the observation side (the selective reflection layer having a reflection wave range covering the shorter wavelength side) can have increased light reflection efficiency, and all of the selective reflection layers in the projected-image-receiving layer can thus have the same light reflection efficiency. Therefore, there can be obtained a projection screen excellent in reproducibility of color.

Furthermore, in the present invention, the two or more selective reflection layers in the projected-image-receiving layer are preferably a selective reflection layer having a reflection wave range with a center wavelength of 430 to 460 nm, a selective reflection layer having a reflection wave range with a center wavelength of 540 to 570 nm, and a selective reflection layer having a reflection wave range with a center wavelength of 580 to 620 nm, provided that light enters the projected-image-receiving layer vertically to it. By so making the selective reflection layers, the projected-image-receiving layer can reflect imaging light (light in the wave ranges for red (R), green (G) and blue (B) colors, the three primary colors of light) projected from a projector such as a liquid crystal projector. There can thus be obtained a projection screen capable of attaining excellent color display.

In the present invention, the specific polarized-light component which the projected-image-receiving layer selectively reflects is either right- or left-handed circularly polarized light. In this case, the projected-image-receiving layer selectively reflects only a specific polarized-light component (e.g., right-handed circularly polarized light) owing to its function of selectively reflecting light (the polarized-light-separating property). It is, therefore, possible to make the projected-image-receiving layer reflect only approximately 50% of unpolarized environmental light, such as sunlight and light from lighting fixtures, incident on the projected-image-receiving layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the one which the projected-image-receiving layer selectively reflects (e.g., right-handed circularly polarized light), the projected-image-receiving layer can reflect nearly 100% of the imaging light projected, that is, the projected-image-receiving layer can efficiently reflect the imaging light. Even a projector that emits linearly polarized light, such as a liquid crystal projector, can be used, regardless of the direction of linear polarization, for projecting imaging light on the projection screen, if a retardation layer or the like for converting linearly polarized light into circularly polarized light is used.

Furthermore, in the present invention, the specific polarized-light component which the projected-image-receiving layer selectively reflects may also be a linearly polarized light of one vibration direction. In this case, the specific polarized-light component which the projected-image-receiving layer selectively reflects is either P- or S-polarized light, and the projected-image-receiving layer selectively reflects only a specific polarized-light component (e.g., P-polarized light) owing to its function of selectively reflecting light (polarized-light-separating property). It is, therefore, possible to make the projected-image-receiving layer reflect only approximately 50% of unpolarized environmental light, such as sunlight and light from lighting fixtures, incident on the projected-image-receiving layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the one which the projected-image-receiving layer selectively reflects (e.g., P-polarized light), the projected-image-receiving layer can reflect nearly 100% of the imaging light projected, that is, the projected-image-receiving layer can efficiently reflect the imaging light. In the case where the specific polarized-light component which the projected-image-receiving layer selectively reflects is linearly polarized light of one vibration direction, it is possible to brightly display an image by making the direction of linear polarization of light to be emitted from a projector agrees with the direction of linear polarization of light which the projected-image-receiving layer diffuse-reflects.

Furthermore, in the present invention, the projected-image-receiving layer may further include, in addition to the two or more selective reflection layers having the function of selectively reflecting a specific polarized-light component, a diffusing layer having the function of diffusing the specific polarized-light component. In this case, since the layer having the function of selectively reflecting the specific polarized-light component and the layer having the function of diffusing the specific polarized-light component can be made independent of each other, these two functions can be easily controlled.

Alternatively, each selective reflection layer constituting the projected-image-receiving layer may have the function of diffusing the specific polarized-light component in addition to the function of selectively reflecting the specific polarized-light component. In this case, the selective reflection layers can show both the function of selectively reflecting the specific polarized-light component and the function of diffusing the specific polarized-light component, so that it is not necessary to separately provide a layer having the function of diffusing the specific polarized-light component. It is therefore possible to obtain a projection screen advantageous from the viewpoints of production efficiency and cost.

In the present invention, it is preferable that each selective reflection layer in the projected-image-receiving layer has a cholesteric liquid crystalline structure, and, owing to structural non-uniformity in the cholesteric liquid crystalline structure, diffuses a specific polarized-light component. In this case, the selective reflection layers can diffuse the projected light while maintaining their original polarized-light-separating property, so that there can be obtained a projection screen providing high image visibility. Moreover, the selective reflection layers convert the light projected from a projector into predetermined circularly polarized light, so that they can efficiently reflect the projected light. In addition, the selective reflection layers can effectively avoid the influence of environmental light such as sunlight and light from lighting fixtures because of the property of selectively reflecting light having a specific wavelength and the property of circularly polarizing light that are possessed by the cholesteric liquid crystalline structures.

DETAILED DESCRIPTION OF PREFERRED EMBODIMENTS

By referring to the accompanying drawings, embodiments of the present invention will be described hereinafter.

Projection Screen

Figure 1:
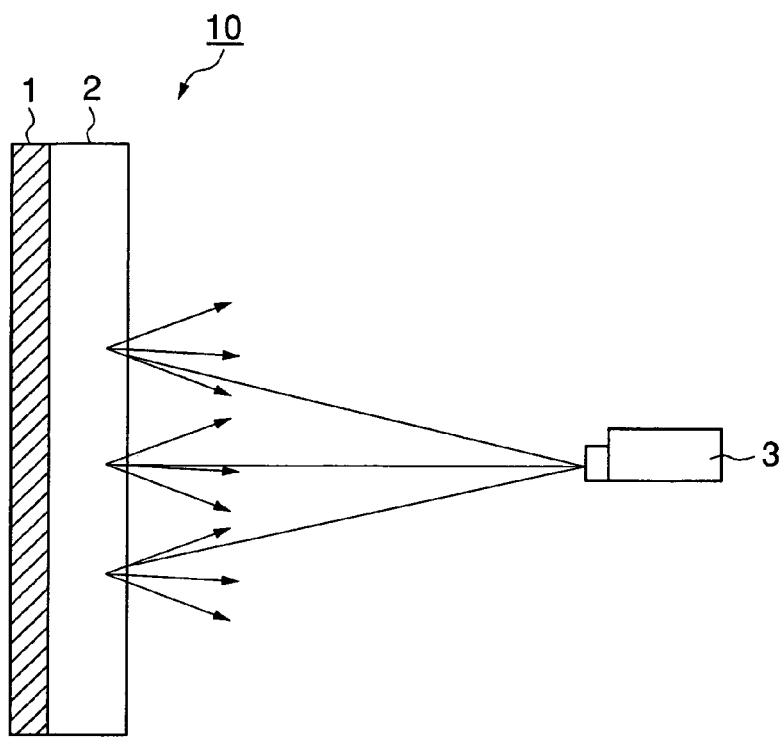
FIG. 1 is a diagrammatic view showing the whole construction of a projection system comprising a projection screen according to an embodiment of the present invention.

As shown in FIG. 1, a projection screen 10 according to this embodiment is for displaying an image by reflecting imaging light projected from a projector 3 such as a liquid crystal projector, and comprises a substrate 1 and a projected-image-receiving layer 2 formed on the substrate 1. The projected-image-receiving layer 2 has the function of selectively reflecting a specific polarized-light component and the function of diffusing the specific polarized-light component. In FIG. 1, the projection screen 10 and the projector 3 constitute a projection system.

The projected-image-receiving layer 2 and the substrate 1 for use in the projection screen 10 shown in FIG. 1 will be described below in detail.

[1. Projected-Image-Receiving Layer]

The projected-image-receiving layer 2 for use in the projection screen 10 will firstly be described.

The projected-image-receiving layer 2 includes two or more selective reflection layers having different reflection wave ranges. Of these selective reflection layers, the selective reflection layer having a reflection wave range covering the shorter wavelength side is situated apart from the observation side as compared with the selective reflection layer having a reflection wave range covering the longer wavelength side. Namely, in the projection screen 10 shown in FIG. 1, the two or more selective reflection layers in the projected-image-receiving layer 2 are successively laminated, the selective reflection layer to be situated on the substrate 1 side being firstly formed, in such a manner that their reflection wave ranges successively cover from the shorter to longer wavelength side. The reflection wave range herein means the wave range that includes the wavelengths at which the selective reflection layer selectively reflects light with intensities of 50% or more of the intensity with which the selective reflection layer most strongly reflects light.

The projected-image-receiving layer 2 has both the function of selectively reflecting a specific polarized-light component and the function of diffusing the specific polarized-light component, as mentioned above, and is embodied in two different fashions. Namely, the first embodiment is that the projected-image-receiving layer 2 includes, in addition to the two or more selective reflection layers having the function of selectively reflecting a specific polarized-light component, a diffusing layer having the function of diffusing the specific polarized-light component. The second embodiment is that each selective reflection layer constituting the projected-image-receiving layer 2 has both the function of selectively reflecting a specific polarized-light component and the function of diffusing the specific polarized-light component.

The details of these two embodiments of the projected-image-receiving layer 2 will be described hereinafter.

(1) First Embodiment

The first embodiment of the projected-image-receiving layer 2 will be firstly described. As described above, this embodiment is that the projected-image-receiving layer 2 includes, in addition to the two or more selective reflection layers having the function of selectively reflecting a specific polarized-light component, a diffusing layer having the function of diffusing the specific polarized-light component. Namely, in the projected-image-receiving layer 2 according to the first embodiment, the selective reflection layers act only to reflect a specific polarized-light component, while the diffusing layer diffuses the specific polarized-light component.

Figure 2:
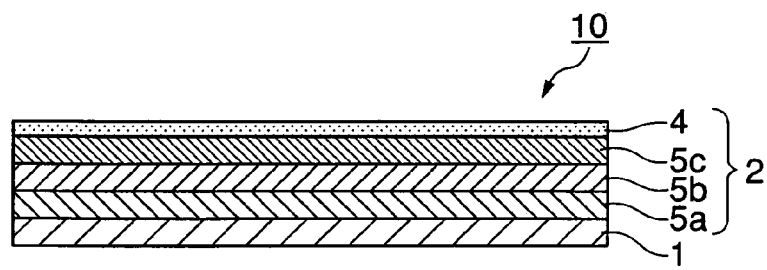
FIG. 2 is a diagrammatic sectional view showing an example of the projection screen shown in FIG. 1.

For example, the projected-image-receiving layer 2 according to the first embodiment includes, as shown in FIG. 2, a plurality of selective reflection layers 5a, 5b and 5c and a diffusing layer 4 formed on these selective reflection layers 5a, 5b and 5c. Of these selective reflection layers 5a, 5b and 5c, the selective reflection layer 5a having a reflection wave range covering the shortest wavelength side is provided on the substrate 1, the selective reflection layer 5b having a reflection wave range covering the second shortest wavelength side is provided on the selective reflection layer 5a, and the selective reflection layer 5c having a reflection wave range covering the longest wavelength side is provided on the observation side in the position most distant from the substrate 1 (that is, the side on which light projected from the projector 3 enters). In the case where the reflection wave ranges of the selective reflection layers 5a, 5b and 5c overlap one another, it is preferable to provide, on the substrate 1 side, the selective reflection layer having a reflection wave range whose center wavelength is shorter, provided that light enters the layer vertically to it.

According to the first embodiment, since the projected-image-receiving layer 2 includes the selective reflection layers 5a, 5b and 5c and the diffusing layer 4, the layer having the function of selectively reflecting a specific polarized-light component and the layer having the function of diffusing the specific polarized-light component can be made independent of each other, and these two properties can be easily controlled. The selective reflection layers 5a, 5b and 5c and the diffusing layer 4 for use in the projected-image-receiving layer 2 according to the first embodiment will be individually described below.

(1-i) Selective Reflection Layers

The selective reflection layers 5a, 5b and 5c for use in the projected-image-receiving layer 2 according to the first embodiment will be firstly described.

The selective reflection layers 5a, 5b and 5c for use in the projected-image-receiving layer 2 according to the first embodiment have the function of selectively reflecting a specific polarized component of light entering the projected-image-receiving layer 2 from the observation side. Any layer can be used for each selective reflection layer 5a, 5b, 5c as long as it can selectively reflect a specific polarized-light component. For example, it is possible to use a selective reflection layer that selectively reflects, as the specific polarized-light component, linearly polarized light of one vibration direction, or right- or left-circularly polarized light.

In the case where the specific polarized-light component which the selective reflection layers 5a, 5b and 5c selectively reflect is linearly polarized light of one vibration direction, the projection screen can brightly display an image if the direction of linear polarization of light to be emitted from a projector is made to agree with the direction of linear polarization of light which the selective reflection layers 5a, 5b, 5c reflect because linearly polarized light includes light in two different states of polarization, the directions of vibration being at right angles to each other. For example, multi-layered reflective polarizers having diffusing properties, made from materials having different refractive indices ("DBEF" manufactured by Sumitomo 3M Limited, Japan, etc.), can be employed as the selective reflection layers that selectively reflect, as the specific polarized-light component, linearly polarized light of one vibration direction.

On the other hand, when the specific polarized-light component which the selective reflection layers 5a, 5b and 5c selectively reflect is either right- or left-handed circularly polarized light, the selective reflection layers 5a, 5b and 5c split unpolarized light incident on them into light in two different states of polarization (right- and left-handed circularly polarized light), and transmit one of these light and reflect the other. This phenomenon is known as circular dichroism. If the direction of rotation of liquid crystalline molecular helix is properly selected, a light component circularly polarized in the same direction as this direction of rotation is selectively reflected.

Figure 3:
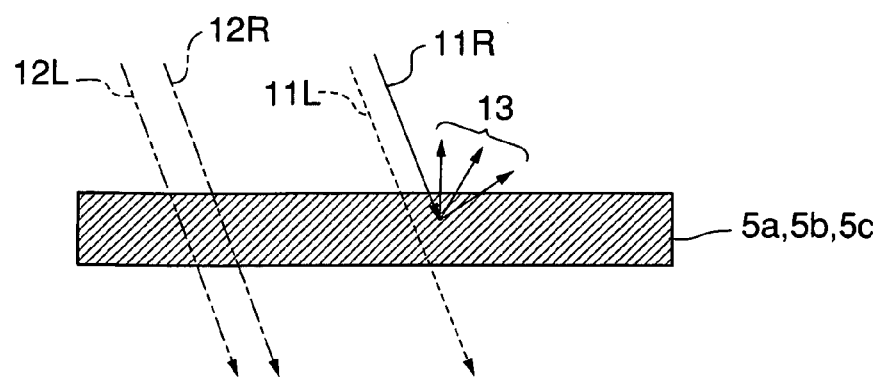
FIG. 3 is a view showing an example of the projected-image-receiving layer (selective reflection layers) in the projection screen shown in FIG. 2.

Namely, as shown in FIG. 3, when unpolarized light (right-handed circularly polarized light 11R and left-handed circularly polarized light 11L in the reflection wave range, and right-handed circularly polarized light 12R and left-handed circularly polarized light 12L not in the reflection wave range) enters the selective reflection layers 5a, 5b and 5c from the observation side, these layers reflect, as reflected light 13, either one of the circularly polarized-light components in the reflection wave range (e.g., right-handed circularly polarized light 11R in the reflection wave range) and transmits the other light components (e.g., left-handed circularly polarized light 11L in the reflection wave range, and right-handed circularly polarized light 12R and left-handed circularly polarized light 12L not in the reflection wave range), owing to the above-described polarized-light-separating property.

Therefore, if the polarized component and wave range of the light which the selective reflection layers 5a, 5b and 5c selectively reflect are made identical with those of the light to be projected from the projector 3, the selective reflection layers 5a, 5b and 5c can effectively reflect the imaging light projected, and there can thus be obtained a projection screen 10 capable of producing an image with high brightness. In this case, even a projector emitting linearly polarized light can be used as the projector 3 for projecting imaging light on the projection screen 10, regardless of the direction of linear polarization, if a retardation layer or the like for converting linearly polarized light into circularly polarized light is used.

Examples of materials that develop the above-described dichroism include cholesteric, liquid crystalline compositions. Physically, liquid crystalline molecules in a cholesteric, liquid crystalline composition are aligned in helical fashion in which the directors of the liquid crystalline molecules are continuously rotated in the direction of the thickness of the layer. Owing to such a physical alignment of the liquid crystalline molecules, there is obtained the polarized-light-separating property, the property of separating a light component circularly polarized in one direction from a light component circularly polarized in the opposite direction.

In this case, the scattering of polarized light is maximized at the wavelength $\lambda_O$ given by the following equation (1):

$$\lambda_O = nav \cdot p, \quad (1)$$

where p is the helical pitch in the helical structure consisting of liquid crystalline molecules (the length of one liquid crystalline molecular helix), and nav is the mean refractive index on a plane perpendicular to the helical axis.

On the other hand, the width $\Delta\lambda$ of the wave range in which the wavelength of light to be reflected falls is given by the following equation (2):

$$\Delta\lambda = \Delta n \cdot p, \quad (2)$$

where $\Delta n$ is the value of birefringence.

In the projected-image-receiving layer 2 according to the first embodiment, each selective reflection layer 5a, 5b, 5c can have any reflection wave range as long as the two or more selective reflection layers 5a, 5b and 5c having different reflection wave ranges are successively laminated, the selective reflection layer to be situated on the substrate 1 side being firstly formed, in such a manner that their reflection wave ranges successively cover from the shorter to longer wavelength side.

It is particularly preferable that the projected-image-receiving layer 2 according to the first embodiment be a laminate of the selective reflection layers 5a, 5b and 5c having reflection wave ranges identical with the wave ranges for red (R), green (G) and blue (B) colors. This is because an ordinary projector 3 emits imaging light including light in the wave ranges for red (R), green (G) and blue (B) colors, and, by using the three primary colors, attains color display. Specifically, for example, assuming that light enters vertically, it is preferable to obtain the projected-image-receiving layer 2 by laminating the following three selective reflection layers: a selective reflection layer having a reflection wave range with a center wavelength of 430 to 460 nm identical with the wave range for blue (B) color, a selective reflection layer having a reflection wave range with a center wavelength of 540 to 570 nm identical with the wave range for green (G) color, and a selective reflection layer having a reflection wave range with a center wavelength of 580 to 620 nm identical with the wave range for red (R) color. This is because, by so laminating the selective reflection layers, there can be obtained a projection screen 10 capable of attaining color display even if the wavelength of light emitted from a projector varies according to the design of the projector, the type of the light source used, etc., and of satisfactorily producing white color.

Not only a laminate of the three selective reflection layers 5a, 5b and 5c as described above but also a laminate of two selective reflection layers, that is, a laminate of a selective reflection layer having a reflection wave range that covers the wave ranges for red (R) and green (G) colors and a selective reflection layer having a reflection wave range identical with the wave range for blue (B) color, may be used as the projected-image-receiving layer 2 according to the first embodiment.

In the case where cholesteric, liquid crystalline compositions are used for forming the selective reflection layers 5a, 5b and 5c constituting the projected-image-receiving layer 2 according to the first embodiment, it is possible to control the reflection wave ranges of the selective reflection layers 5a, 5b and 5c by changing the type of the liquid crystalline compositions for forming these layers, or by controlling the process conditions under which the layers are formed, for example.

It is preferable that each selective reflection layer 5a, 5b, 5c in the projected-image-receiving layer 2 according to the first embodiment be made to have such a thickness that the projected-image-receiving layer 2 can reflect approximately 100% of light in a specific state of polarization that is selectively reflected. This is because the reflectance for a specific polarized-light component (e.g., right-handed circularly polarized light) which a selective reflection layer selectively reflects usually depends on the thickness of the selective reflection layer, and because if the selective reflection layer has a reflectance of less than 100% for a specific polarized-light component that is selectively reflected (e.g., right-handed circularly polarized light), this layer cannot efficiently reflect imaging light. Specifically, for example, when each selective reflection layer is made from a cholesteric, liquid crystalline composition, it is preferable to make the cholesteric liquid crystalline structure contain approximately 4 to 8 helical turns in order to obtain a reflectance of 100%. In this case, each selective reflection layer usually has a thickness of approximately 1 to 10 μm although this thickness varies depending on the type of the liquid crystalline composition used for forming this layer and also on the selective reflection wave range of this layer. When each selective reflection layer has a thickness smaller than the above-described thickness, the layer has a low reflectance, and the image projected on the projection screen is poor in brightness. On the other hand, when each selective reflection layer has a thickness exceeding the above range, it becomes difficult to control the orientation of the cholesteric liquid crystalline structure, and the selective reflection layer cannot be uniformly formed.

Although the thickness of the selective reflection layer formed on the substrate 1 side (the selective reflection layer 5*a* in the case shown in FIG. 2) varies depending upon the distance from the plane of incidence, it is usually from 1.5 to 2.5 times, more preferably from 1.5 to 2.0 times, the thickness of the selective reflection layer that is provided on the side on which light emitted from the projector 3 is projected.

Preferably, the value $a=t/\lambda$, where t is the thickness of the selective reflection layer 5*a*, 5*b*, 5*c*, and $\lambda$ is the center wavelength of the reflection wave range of the selective reflection layer 5*a*, 5*b*, 5*c* in the case where light enters the layer vertically to it, fulfills the requirement that the value "a" obtained in terms of the selective reflection layer having a reflection wave range covering the shorter wavelength side is greater than that obtained in terms of the selective reflection layer having a reflection wave range covering the longer wavelength side. By making the thickness t and the center wavelength $\lambda$ of the reflection wave range of each selective reflection layer 5*a*, 5*b*, 5*c* meet the above requirement, it is possible to increase the light reflection efficiency of the selective reflection layer provided on the substrate 1 side, having a reflection wave range covering the shorter wavelength side, thereby making the selective reflection layers 5*a*, 5*b* and 5*c* in the projected-image-receiving layer 2 have the same light reflection efficiency. There can thus be obtained a projection screen 10 excellent in reproducibility of color.

Although each selective reflection layer for use in the projected-image-receiving layer 2 according to the first embodiment reflects light with a fixed wavelength, it may also be made to reflect light with different wavelengths continuously varying along thickness. Specifically, for example, a laminate of a selective reflection layer having a reflection wave range covering the shortest wavelength side and a selective reflection layer that reflects light with wavelengths continuously varying from shorter to longer may be used as the projected-image-receiving layer 2. The selective reflection layer that selectively reflects light with wavelengths continuously varying along thickness herein refers to such a selective reflection layer that the wavelength of light that is most strongly reflected from points on the layer positioned along thickness varies continuously along thickness.

Further, the selective reflection layers for use in the projected-image-receiving layer 2 according to the first embodiment are not necessarily independent layers, and they may be constituent layers of a single selective reflection layer that selectively reflects light with wavelengths continuously varying along thickness, as long as the constituent layer having a reflection wave range covering the shortest wavelength side, being positioned on the substrate 1 side, can be made thick.

(1-ii) Diffusing Layer

The diffusing layer 4 for use in the projected-image-receiving layer 2 according to the first embodiment will be described below.

The diffusing layer 4 for use in the projected-image-receiving layer 2 according to the first embodiment has the function of diffusing the specific polarized-light component selectively reflected from the selective reflection layers 5*a*, 5*b* and 5*c*. Such a diffusing layer 4 is usually provided on the observation side of the selective reflection layers 5*a*, 5*b* and 5*c* in order to diffuse, toward the observation side, the light selectively reflected from the selective reflection layers 5*a*, 5*b* and 5*c*. As described above, the diffusing layer 4 is provided together with the selective reflection layers 5*a*, 5*b* and 5*c*, so that it is possible to scatter the light selectively reflected from the selective reflection layers 5*a*, 5*b* and 5*c*. There can thus be obtained a projection screen 10 that can provide high image visibility even under bright environmental light and can therefore be used under bright environmental light.

The diffusing layer 4 may be any one of bulk diffusers, surface diffusers and hologram diffusers, or any combination of these diffusers. A bulk diffuser may be particles dispersed in a transparent medium, for example. A surface diffuser may be a structured, micro-structured, or roughened surface, for example. The diffusion provided by the diffuser may be random, regular, or partly regular.

(2) Second Embodiment

The second embodiment of the projected-image-receiving layer 2 will be described below. As mentioned above, the second embodiment of the projected-image-receiving layer 2 is that each selective reflection layer constituting the projected-image-receiving layer 2 has both the function of selectively reflecting a specific polarized-light component and the function of diffusing the specific polarized-light component.

Figure 4:
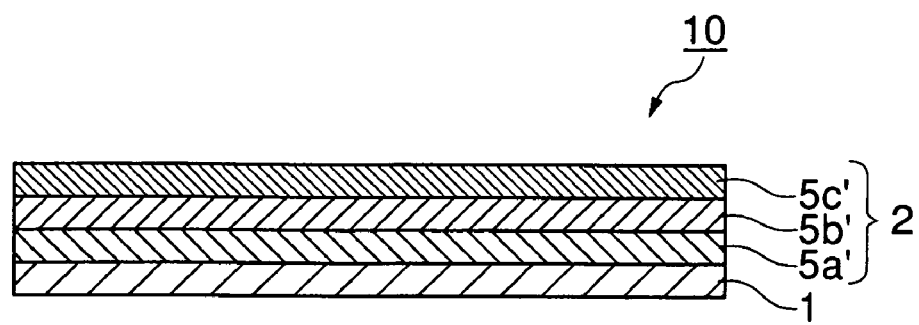
FIG. 4 is a diagrammatic sectional view showing another example of the projection screen shown in FIG. 1.

Such a projected-image-receiving layer 2 according to the second embodiment includes a laminate of a plurality of selective reflection layers 5*a'*, 5*b'* and 5*c'* having both the function of selectively reflecting a specific polarized-light component and the function of diffusing the specific polarized-light component, as shown in FIG. 4, for example. In this case, the selective reflection layer 5*a'* having a reflection wave range covering the shortest wavelength side is provided on the substrate 1, the selective reflection layer 5*b'* having a reflection wave range covering the second shortest wavelength side is provided on the selective reflection layer 5*a'*, and the selective reflection layer 5*c'* having a reflection wave range covering the longest wavelength side is provided on the observation side in the position most distant from the substrate 1 (that is, on the side on which light projected from a projector 3 enters). In the case where the reflection wave ranges of the selective reflection layers 5*a'*, 5*b'* and 5*c'* overlap one another, it is preferable to provide, on the substrate 1 side, the selective reflection layer having a reflection wave range whose center wavelength is shorter, provided that light enters the layer vertically to it.

According to the second embodiment, since the selective reflection layers 5*a'*, 5*b'* and 5*c'* constituting the projected-image-receiving layer 2 have both the function of selectively reflecting a specific polarized-light component and the function of diffusing the specific polarized-light component, there is no need to separately provide a layer having the function of diffusing the specific polarized-light component. For this reason, the second embodiment is advantageous also from the viewpoints of production efficiency, cost, etc.

Any layer can be used as each selective reflection layer 5*a'*, 5*b'*, 5*c'* for use in the projected-image-receiving layer 2 according to the second embodiment as long as it has both the function of selectively reflecting a specific polarized-light component and the function of diffusing the specific polarized-light component. It is, however, particularly preferable to use a cholesteric liquid crystalline layer having the function of diffusing the specific polarized-light component, made from a cholesteric liquid crystalline composition.

An ordinary cholesteric liquid crystalline layer has a specular surface and reflects the light from a projector 3 in only one direction. It is, therefore, difficult to use such a cholesteric liquid crystalline layer as a projection screen. On the contrary, a cholesteric liquid crystalline layer having the function of diffusing a specific polarized-light component reflects the specific polarized-light component while diffusing it, so that such a layer can provide improved image visibility and can therefore be used as a projection screen. A cholesteric liquid crystalline structure can have the function of diffusing a specific polarized-light component when it is structurally non-uniform, for example. Specifically, for example, the cholesteric liquid crystalline layer can have the function of diffusing a specific polarized-light component when block structures (helical structure parts) 30 contained in the cholesteric liquid crystalline structure are made to have helical axes L extending in different directions, as in the selective reflection layers 5a', 5b' and 5c' shown in FIG. 5.

Figure 5:
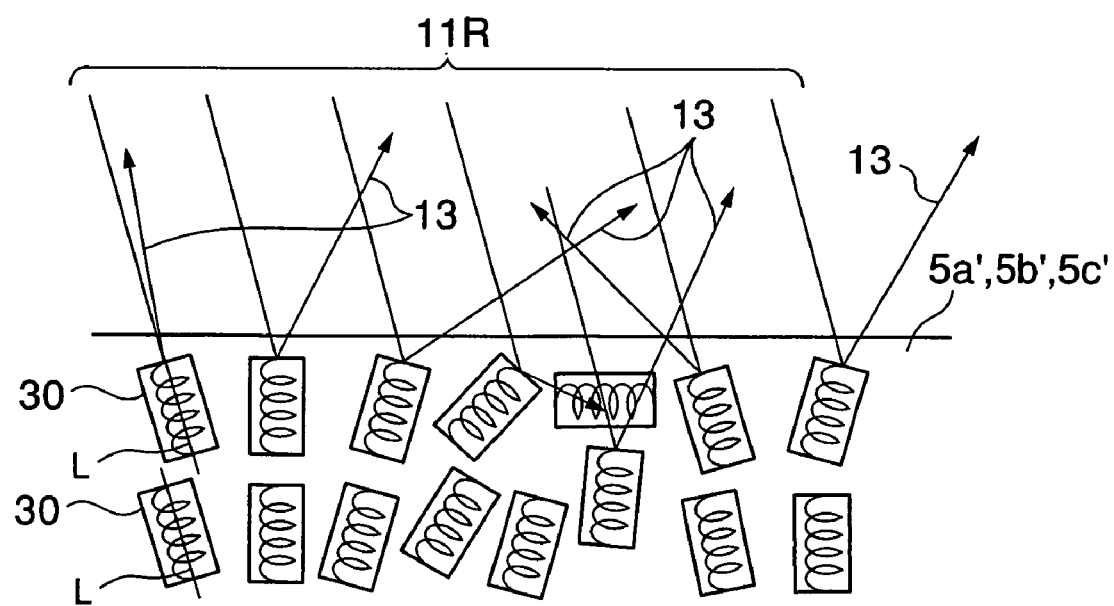
FIG. 5 is an illustration for explaining the state of orientation of and optical function of the projected-image-receiving layer (selective reflection layers) in the projection screen shown in FIG. 4.

Namely, in a selective reflection layer having a conventional cholesteric liquid crystalline structure, all helical axes extend in the direction of the normal to the substrate 1 plane, so that light incident on this selective reflection layer is reflected in only one direction. On the contrary, the selective reflection layers 5a', 5b' and 5c', each having a cholesteric liquid crystalline structure containing a plurality of helical structure parts 30 whose helical axes L extend in different directions, reflect incident light not in one direction but in directions varying depending on the direction of the helical axis L, as shown in FIG. 5. The incident light is thus reflected in the state of being scattered (as reflected light 13).

Examples of methods for forming each selective reflection layer 5a', 5b', 5c' having a cholesteric liquid crystalline structure containing a plurality of helical structure parts 30 whose helical axes L extend in different directions include, as will be described later, a method in which a liquid crystalline composition is applied to a substrate having no aligning power that acts in one direction; a method in which the amount of a leveling agent that is usually incorporated in a liquid crystalline composition for forming a selective reflection layer is controlled; a method in which the amount of additives to be added to a liquid crystalline composition for forming a selective reflection layer is controlled; and any combination of these methods. When one of these methods is used for forming the selective reflection layers 5a', 5b' and 5c', the resulting layers have cholesteric liquid crystalline structures in which the orientation of liquid crystalline molecules is disturbed. These selective reflection layers 5a', 5b' and 5c' reflect the incident light while diffusing it.

The layer construction, reflection wave ranges, thickness, etc. of the selective reflection layers for use in the projected-image-receiving layer 2 according to the second embodiment are the same as those of the selective reflection layers for use in the projected-image-receiving layer 2 according to the first embodiment, so that explanation for them is herein omitted.

Further, each selective reflection layer in the projected-image-receiving layer 2 according to the second embodiment is, like each selective reflection layer in the projected-image-receiving layer 2 according to the first embodiment, may be not only a layer that reflects light with a fixed wavelength, but also a layer that reflects light with wavelengths continuously varying along thickness. Specifically, for example, a laminate of a selective reflection layer having a reflection wave range covering the shortest wavelength side and a selective reflection layer that reflects light with wavelengths continuously varying from shorter to longer may be used as the projected-image-receiving layer 2. The layer that reflects light with wavelengths continuously varying along thickness herein refers to such a layer that the wavelength of light that is most strongly reflected from points on the layer positioned along thickness varies continuously along thickness.

Furthermore, like the selective reflection layers for use in the projected-image-receiving layer 2 according to the first embodiment, the selective reflection layers for use in the projected-image-receiving layer 2 according to the second embodiment are not necessarily independent layers and may be constituent layers of a single selective reflection layer that selectively reflects light with wavelengths continuously varying along thickness, as long as the constituent layer having a reflection wave range covering the shortest wavelength side, being positioned on the substrate 1 side, can be made thick.

(3) Details of Selective Reflection Layers for Use in Projected-Image-Receiving Layers According to First and Second Embodiments As mentioned above, cholesteric liquid crystalline compositions may be used as materials for forming the selective reflection layers constituting the projected-image-receiving layers 2 according to the first and second embodiments. More specifically, chiral nematic liquid crystals or cholesteric liquid crystals may be used for the cholesteric liquid crystalline compositions. Although any liquid crystalline material can be used as long as it can develop a cholesteric liquid crystalline structure, particularly preferable one for obtaining, after curing, an optically stable selective reflection layer is a polymerizable liquid crystalline material having polymerizable functional groups at both ends of its molecule. In the case where the polymerizable, liquid crystalline material is nematic or smectic, it is possible to make this liquid crystalline material cholesteric by adding a chiral agent or the like.

Materials and methods for forming the selective reflection layers constituting the projected-image-receiving layers 2 according to the first and second embodiments will be described hereinafter with reference to the case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material to make the resulting liquid crystalline composition cholesteric as a whole. By varying the chiral power by changing the type of the chiral agent to be added to a liquid crystalline composition, or by varying the content of the chiral agent in the liquid crystalline composition, it is possible to control the reflection wave range (the center wavelength of the selective reflection wave range) that is determined by the molecular structure of the polymerizable liquid crystalline material.

(3-i) Polymerizable Liquid Crystalline Material

Examples of polymerizable liquid crystalline materials having polymerizable functional groups include Compound (I) represented by the following general formula (1) and Compound (II) represented by the following formulae (2) to (12). A mixture of at least two of the compounds represented by the general formula (1) may be used as Compound (I); and a mixture of at least two of the compounds represented by the formulae (2) to (12) may be used as Compound (II). A mixture of Compounds (I) and (II) may also be used.

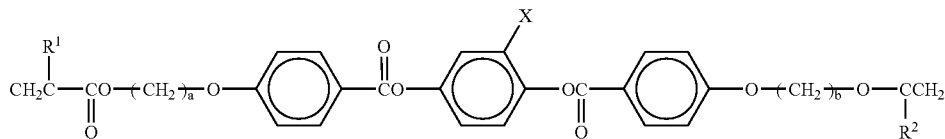 (1)

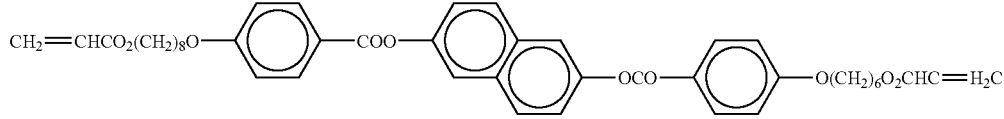 (2)

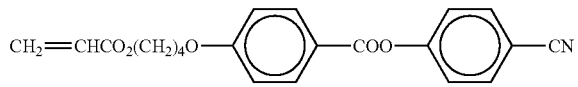 (3)

 (4)

 (5)

 (6)

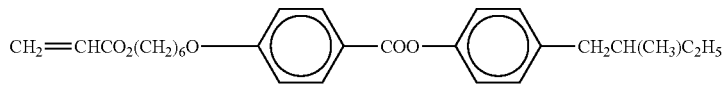 (7)

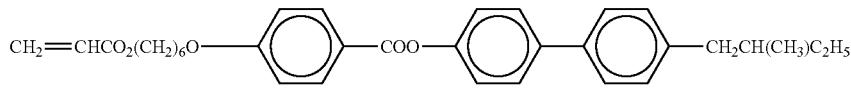 (8)

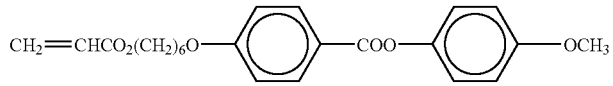 (9)

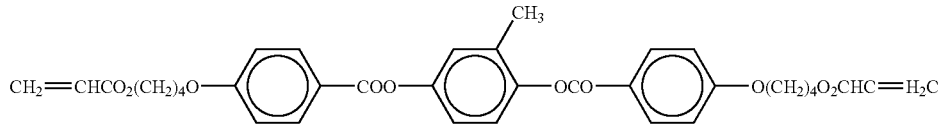 (10)

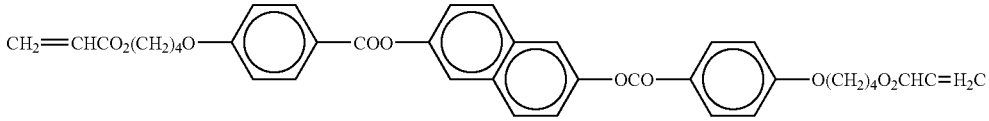 (11)

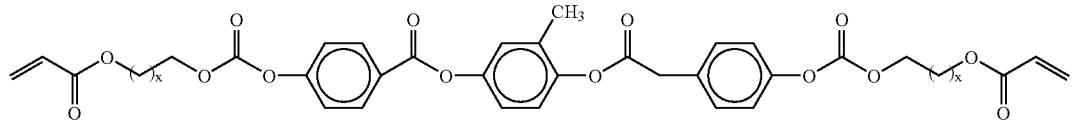 (12)

where X is an integer of 2–5

In the above general formula (1) denoting Compound (I), $R^1$ and $R^2$ independently represent hydrogen or methyl group. It is, however, preferable that both $R^1$ and $R^2$ represent hydrogen because a liquid crystalline composition containing such a compound shows a liquid crystal phase at temperatures in a wider range. X is hydrogen, chlorine, bromine, iodine, an alkyl group having 1 to 4 carbon atoms, methoxy group, cyano group or nitro group, preferably chlorine or methyl group. Further, in the above general formula (1), a and b that denote the chain lengths of the alkylene groups that serve as spacers between the (meth)acryloyloxy groups on both ends of the molecule and the aromatic rings are independently an integer of 2 to 12, preferably an integer of 4 to 10, more preferably an integer of 6 to 9. Those compounds represented by the general formula (1) in which a=b=0 are unstable, easily undergo hydrolysis, and have high crystallinity. On the other hand, those compounds represented by the general formula (1) in which a and b are independently an integer of 13 or more have low isotropic transition temperatures (TI's). These compounds are undesirable because they show liquid crystal phases at temperatures in narrow ranges.

Although a polymerizable liquid crystal monomer is, in the above description, used as the polymerizable liquid crystalline material, it is also possible to use, instead of the polymerizable liquid crystal monomer, a polymerizable liquid crystal oligomer or polymer, a liquid crystal polymer, or the like, properly selected from conventionally proposed ones.

(3-ii) Chiral Agent

The chiral agent is a low molecular weight compound containing an optically active site, having usually a molecular weight of not more than 1,500. In general, the chiral agent is used in order to convert the positive mono-axially-nematic structure of a polymerizable liquid crystalline material, such as Compound (I) or Compound (II) that is used as needed, into a helical structure. Any type of low molecular weight compounds capable of attaining the above purpose may be used as the chiral agent as long as it is compatible with the polymerizable, nematic liquid crystalline material (Compound (I), a mixture of Compounds (I) and (II), etc.) in the state of solution or melt and can make the polymerizable, nematic liquid crystalline material helical with the desired helical pitch without impairing the liquid crystallinity of this material.

The chiral agent that is used for making the structure of a liquid crystal helical is required to have any type of chirality at least in its molecule. Examples of chiral agents useful herein include those compounds having 1, or 2 or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals such as a chiral dopant liquid crystal "S-811" manufactured by Merck KGaA, Germany.

However, depending on the nature of the chiral agent selected, the following problems can occur: the nematic state of the polymerizable, nematic liquid crystalline material (Compound (I), a mixture of Compounds (I) and (II), etc.) is destroyed, and the polymerizable, nematic liquid crystalline material loses its alignability; and, if the chiral agent is non-polymerizable, the liquid crystalline composition has reduced hardenability, and the cured film is poor in reliability. Moreover, the use of a large amount of a chiral agent having an optically active site boosts the cost of the liquid crystalline composition. Therefore, to form a cholesteric, selective reflection layer having a short helical pitch, it is preferable to select, as the optically-active-site-containing chiral agent to be incorporated in the liquid crystalline composition, a chiral agent whose helical-structure-developing action is great. Specifically, it is preferable to use axially chiral Compound (III) represented by the following general formulae (13), (14) and (15).

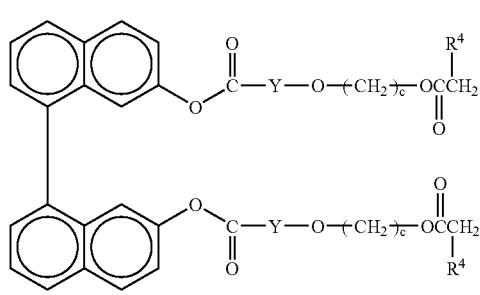

(13)

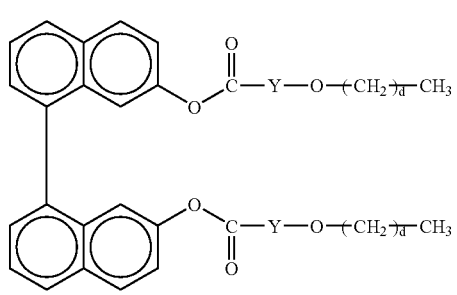

(14)

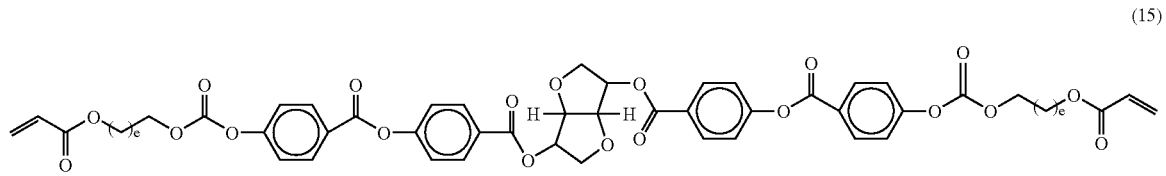

(15)

where e is an integer of 2–5

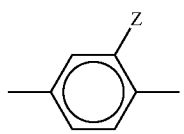

(i)

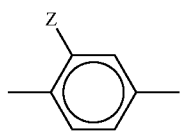

(ii)

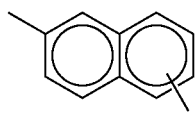

(iii)

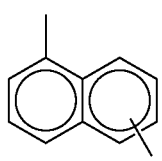

(iv)

-continued

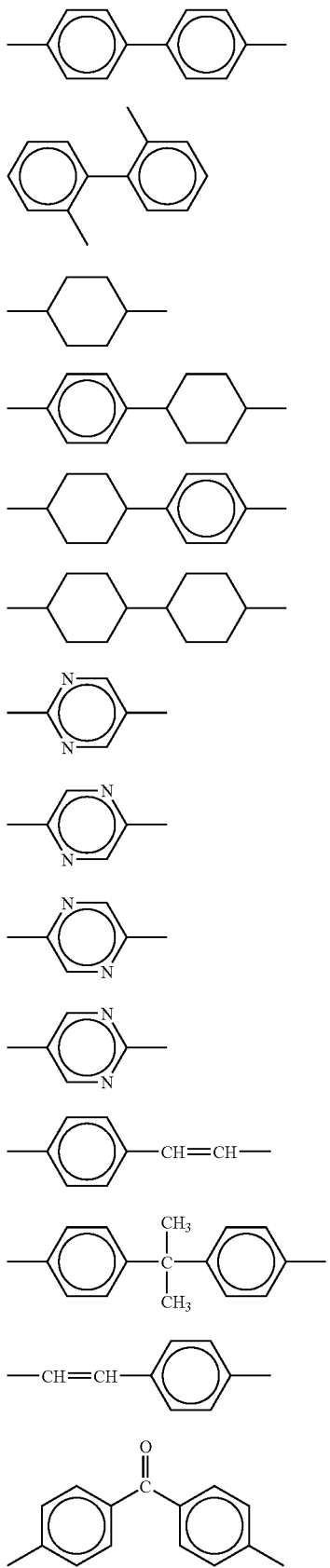

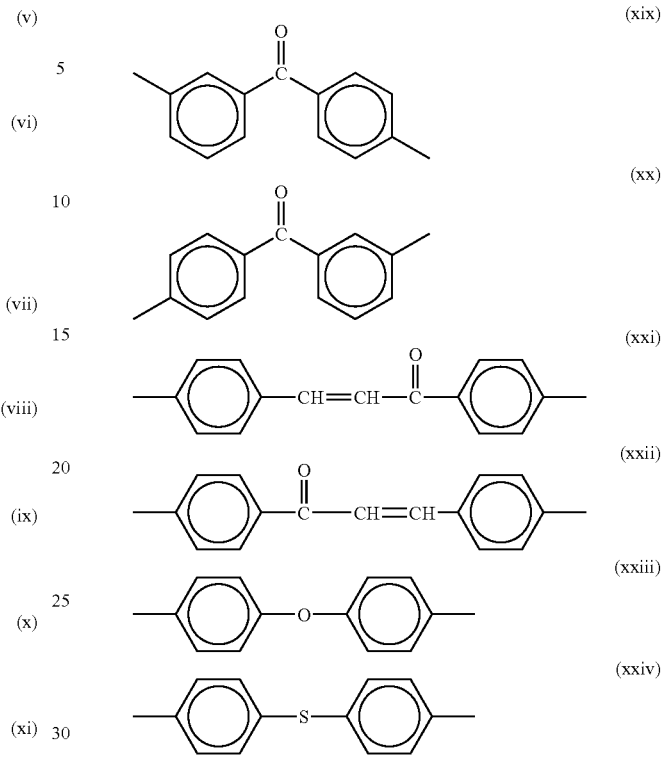

In the above general formula (13) or (14) denoting Compound (III), $R^4$ represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Those compounds represented by the above general formula (13) or (14) in which c or d is 0 or 1 are poor in stability, easily undergo hydrolysis, and have high crystallinity. On the other hand, those compounds represented by the general formula (13) or (14) in which c or d is 13 or more have low melting points (Tm's). These compounds are less compatible with the polymerizable, nematic liquid crystalline material (Compound (I), a mixture of Compounds (I) and (II), etc.), so that a liquid crystalline composition containing, as the chiral agent, such a compound may cause phase separation depending on the concentration of the compound.

The chiral agent is not necessarily polymerizable. However, if the chiral agent is polymerizable, it is polymerized with the polymerizable, nematic liquid crystalline material to give a stably fixed cholesteric structure. Therefore, from the viewpoint of thermal stability and the like, it is highly desirable that the chiral agent be polymerizable. In particular, the use of a chiral agent having polymerizable functional groups at both ends of its molecule is preferable to obtain a selective reflection layer excellent in heat resistance.

The content of the chiral agent in the liquid crystalline composition is optimally decided in consideration of the helical-structure-developing ability of the chiral agent, the cholesteric liquid crystalline structure of the resulting selective reflection layer, and so forth. Although the amount of the chiral agent to be added greatly varies depending upon the components of the liquid crystalline composition, it is from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. In the case where the amount of the chiral agent added is smaller than the above range, there is a possibility that the liquid crystalline composition cannot fully become cholesteric. On the other hand, when the amount of the chiral agent added exceeds the above-described range, the alignment of liquid crystalline molecules is impeded, which can adversely affect the curing of the liquid crystalline composition that is conducted by the application of activating radiation or the like.

(3-iii) Other Additives

In the liquid crystalline compositions for forming the above-described selective reflection layers, those materials that are usually used for conventional selective reflection layers, such as photopolymerization initiators, sensitizers and leveling agents, are incorporated, as needed, in addition to the polymerizable, nematic liquid crystalline materials and the chiral agents.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-choloro-4-propoxythioxanthone. In addition to photopolymerization initiators, sensitizers may be added to the liquid crystalline composition unless they hinder the attainment of the object of the present invention.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

To form the selective reflection layers 5a', 5b' and 5c' constituting the projected-image-receiving layer 2 according to the second embodiment, having cholesteric liquid crystalline structures in which the axes of liquid crystalline molecular helixes extend in different directions, the axes of liquid crystalline molecular helixes may be pointed to different directions by making use of the liquid crystalline compositions themselves for forming the selective reflection layers 5a', 5b' and 5c'.

Specifically, for example, by adding large amounts of surface active agents to the liquid crystalline compositions for forming the selective reflection layers 5a', 5b' and 5c', it is possible to disturb the orientation of the cholesteric liquid crystal surfaces, thereby making the axes of the liquid crystalline molecular helixes extend in different directions. Further, by incorporating large amounts of photopolymerization initiators in the liquid crystalline compositions for forming the selective reflection layers 5a', 5b' and 5c', it is possible to make the molecular chains of cholesteric liquid crystals short, thereby making the axes of the liquid crystalline molecular helixes extend in different directions. In this case, after the reaction has been completed, the photopolymerization initiators also serve as impurities that disturb the orientation of cholesteric liquid crystals.

The axes of the liquid crystalline molecular helixes may be made to extend in different directions by adding polymerizable compounds having no aligning power to the liquid crystalline compositions for forming the selective reflection layers 5a', 5b' and 5c'. If polymerizable compounds having no aligning power are added to the liquid crystalline compositions, the orientation of the cholesteric liquid crystals is disturbed, and the axes of the liquid crystalline molecular helixes tilt. Moreover, the axes of the liquid crystalline molecular helixes may be made to extend in different directions by disturbing the orientation of the cholesteric liquid crystals by the addition of fine particles to the liquid crystalline compositions.

Further, the axes of the liquid crystalline molecular helixes may be made to extend in different directions by the combination use of the above-described techniques. The type and amount of additives that are used in the above techniques are properly selected according to the purpose, etc. of the use of the additives.

(3-iv) Methods for Forming Selective Reflection Layers

The selective reflection layers constituting the projected-image-receiving layers 2 according to the first and second embodiments can be obtained by applying, to substrates 1 that will be described later in detail, liquid crystalline compositions consisting of the above-described polymerizable, nematic liquid crystalline materials, chiral agents, and other additives, and then aligning and curing the liquid crystalline compositions applied.

Although the liquid crystalline composition can be applied to the substrate 1 as it is, it is preferable to dissolve the liquid crystalline composition in an organic solvent in order to control viscosity and aligning power. Any solvent can be used as long as it does not attack the substrate 1 that will be described later. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. In this case, the liquid crystalline composition is usually diluted to preferably 5 to 50% by weight, more preferably 10 to 30% by weight.

Any of the known methods can be employed to apply the liquid crystalline composition to the substrate 1. Specifically, a roll, gravure, bar, slide, die, slit, or dip coating method can be used for this purpose. In the case where a plastic film is used as the substrate 1, a film coating method using a so-called roll-to-roll system may be used.

By effecting the above step of application, the liquid crystalline composition is applied to the substrate 1, thereby forming a cholesteric liquid crystal layer.

Subsequently, the cholesteric liquid crystal layer formed on the substrate 1 is held at a predetermined temperature at which a cholesteric liquid crystalline structure is developed, thereby aligning liquid crystalline molecules in the cholesteric liquid crystal layer. The cholesteric liquid crystalline structure of each selective reflection layer for use in the projected-image-receiving layer 2 according to the second embodiment that should be finally obtained is not in the state of planar orientation but in such a state of orientation that the axes of liquid crystalline molecular helixes extend in different directions. Even so, it is necessary to conduct alignment treatment. Namely, although it is not necessary to conduct alignment treatment for aligning, in one direction on the substrate 1, the directors of liquid crystalline molecules in the cholesteric liquid crystalline structure, it is necessary to conduct such alignment treatment that liquid crystalline molecular helixes are produced in the cholesteric liquid crystalline structure.

When the cholesteric liquid crystal layer on the substrate 1 is held at a predetermined temperature at which a cholesteric liquid crystalline structure is developed, the layer shows a liquid crystal phase. At this time, owing to the self-accumulating action of liquid crystalline molecules themselves, continuous rotation of the directors of the liquid crystalline molecules occurs in the direction of the thickness of the layer, and a helical structure is produced. It is possible to fix this cholesteric liquid crystalline structure in a liquid crystal phase state by curing the cholesteric liquid crystal layer using such a technique as will be described later.

In the case where the liquid crystalline composition applied to the substrate 1 contains a solvent, the step of alignment is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time (heating time) is preferably from 15 to 600 seconds, more preferably from 30 to 180 seconds. After once conducting the drying treatment, if it is realized that the liquid crystal layer is not fully orientated, this layer may be further heated accordingly. In the case where this drying treatment is conducted by means of vacuum drying, it is preferable to separately conduct heat treatment in order to align liquid crystalline molecules.

After aligning liquid crystalline molecules in the cholesteric liquid crystal layer in the above-described step of alignment, the cholesteric liquid crystal layer is cured in the step of curing, thereby fixing the cholesteric liquid crystalline structure that has been developed in the liquid crystal phase state.

To effect the step of curing, it is possible to use: (1) a method in which the solvent contained in the liquid crystalline composition is evaporated; (2) a method in which liquid crystalline molecules in the liquid crystalline composition are thermally polymerized; (3) a method in which liquid crystalline molecules in the liquid crystalline composition are polymerized by the application of radiation; or (4) any combination of these methods.

Of the above methods, the method (1) is suitable for the case where a liquid crystal polymer is used as the polymerizable, nematic liquid crystalline material that is incorporated in the liquid crystalline composition for forming the cholesteric liquid crystal layer. In this method, the liquid crystal polymer is dissolved in a solvent such as an organic solvent, and this solution is applied to the substrate 1. In this case, a solidified, cholesteric liquid crystal layer can be obtained by simply removing the solvent by drying. The type of the solvent, the drying conditions, and so on are the same as those ones in the aforementioned steps of application and alignment.

The above-described method (2) is for curing the cholesteric liquid crystal layer by thermally polymerizing liquid crystalline molecules in the liquid crystalline composition by heating. In this method, the state of bonding of the liquid crystalline molecules varies according to heating (baking) temperature. Therefore, if the cholesteric liquid crystal layer is heated non-uniformly, the cured layer cannot be uniform in physical properties such as film hardness and in optical properties. In order to limit variations in film hardness to ±10%, it is preferable to control the heating temperature so that it varies only within ±5%, preferably ±2%.

Any method may be employed to heat the cholesteric liquid crystal layer formed on the substrate 1 as long as it can provide uniformity in heating temperature. The liquid crystal layer may be placed directly on a hot plate and held as it is, or placed indirectly on a hot plate with a thin air layer interposed between the liquid crystal layer and the hot plate and held parallel with the hot plate. Besides, a method using a heater capable of entirely heating a particular space, such as an oven, may be employed. In this case, the liquid crystal layer is placed in or passed through such a heater. If a film coater or the like is used, it is preferable to make the drying zone long enough to make the heating time sufficiently long.

The heating temperature required is usually as high as 100° C. or more. However, considering the heat resistance of the substrate 1, it is preferable to limit this temperature to below approximately 150° C. If a film or the like specialized with respect to heat resistance is used as the substrate 1, the heating temperature can be made as high as above 150° C.

The above-described method (3) is for curing the cholesteric liquid crystal layer by photo-polymerizing liquid crystalline molecules in the liquid crystalline composition by the application of radiation. In this method, electron beams, ultraviolet rays, or the like fitting for the conditions can be used as the radiation. In general, ultraviolet light is preferred because of the simplicity of ultraviolet light irradiation systems, and so forth. The wavelength of ultraviolet light useful herein is from 250 to 400 nm. If ultraviolet light is used, it is preferable to incorporate a photopolymerization initiator in the liquid crystalline composition in advance. The amount of the photopolymerization initiator to be added to the liquid crystalline composition is 0.01 to 20% by weight, preferably 0.1 to 10% by weight, more preferably 0.5 to 5% by weight, of the liquid crystalline composition.

By effecting a series of the above steps (the steps of application, alignment and curing), it is possible to form a first selective reflection layer. By then repeatedly conducting a series of the above-described steps, it is possible to obtain a projected-image-receiving layer including a plurality of selective reflection layers. In this process, the selective reflection layers are successively formed, the selective reflection layer having a reflection wave range covering the shortest wavelength side being firstly formed. Continuity is, in this case, produced between the cholesteric liquid crystalline structure (the state of orientation) of the upper cholesteric liquid crystal layer and that of the lower cholesteric liquid crystal layer. Therefore, there is no need to provide an alignment-controlling layer or the like between these two cholesteric liquid crystal layers. However, an intermediate layer such as an adherent layer may be provided between these two cholesteric liquid crystal layers, as needed.

Further, to form a selective reflection layer that reflects light with wavelengths continuously varying along thickness, the following method may be used, for example. Using the same liquid crystalline composition as in the above-described method for forming the selective reflection layer, the steps of application and alignment are effected in the above-described manners, and then, in the step of curing, ultraviolet light is applied in a quantity of approximately 1 to 10% of that of ultraviolet light applied in the above-described step of curing. During the application of ultraviolet light, the observation side surface of the cholesteric liquid crystal layer is exposed to the atmosphere with an oxygen concentration of 10% or more at normal pressures. The substrate 1 is heated while gradually decreasing the partial pressure of oxygen in this atmosphere. Thus, there can be obtained a selective reflection layer that reflects light with wavelengths continuously varying along thickness. Besides this method, those methods described in the specification of U.S. Pat. No. 5,691,789 and in Japanese Laid-Open Patent Publication No. 281814/1994 may be employed.

[2. Substrate]

Next, explanation for the substrate 1 for use in the projection screen 10 will be given below.

The substrate 1 is for supporting the projected-image-receiving layer 2. Although any material can be used for the substrate 1 as long as the projected-image-receiving layer 2 can be formed on it, it is preferable that the substrate 1 contains a light-absorbing layer capable of absorbing light in the visible region (e.g., light in a wave range of 400 to 700 nm). Such a substrate 1 absorbs those unpolarized light entering the projection screen 10 from the observation side that are inherently not reflected from the projection screen 10 as reflected light 13 (left-handed circularly polarized light 11L in the reflection wave range, and right-handed circularly polarized light 12R and left-handed circularly polarized light 12L not in the reflection wave range) and the light that enters the projection screen 10 from the backside. It is, therefore, possible to effectively prevent reflection of environmental light such as sunlight and light from lighting fixtures and production of stray light from imaging light.

For example, a plastic film in which a black pigment or the like is incorporated can be used as the substrate 1 capable of absorbing light in the visible region. A transparent plastic film on which a light-absorbing layer is formed may also be used as the substrate 1. In this case, the light-absorbing layer may be formed on the substrate 1 on the side on which the projected-image-receiving layer 2 is formed or on the other side.

Further, to form the above-described projected-image-receiving layer 2 according to the second embodiment, it is necessary to make the cholesteric liquid crystalline structures of the selective reflection layers 5a', 5b' and 5c' not in the state of planar orientation, so that it is preferable to use, as the substrate 1, a material whose surface to which the liquid crystalline composition will be applied has little aligning power. For example, a plastic film that has not been subjected to stretching or rubbing treatment can be used as the material having little aligning power.

A cholesteric liquid crystal layer is usually formed on a plastic film or the like that has been subjected to stretching or rubbing treatment so that the resulting layer is satisfactorily cholesteric. However, in the case of the above-described projected-image-receiving layer 2 according to the second embodiment, a cholesteric liquid crystal layer is formed on a substrate 1 that has not been subjected to stretching or rubbing treatment and has little aligning power. This is because if a cholesteric liquid crystal layer is formed on a substrate 1 having little aligning power, liquid crystalline molecules present on the substrate 1 side surface of the cholesteric liquid crystal layer are not regularly aligned, whereby the axes of liquid crystalline molecular helixes in the cholesteric liquid crystalline structure extend in different directions.

Figure 6:
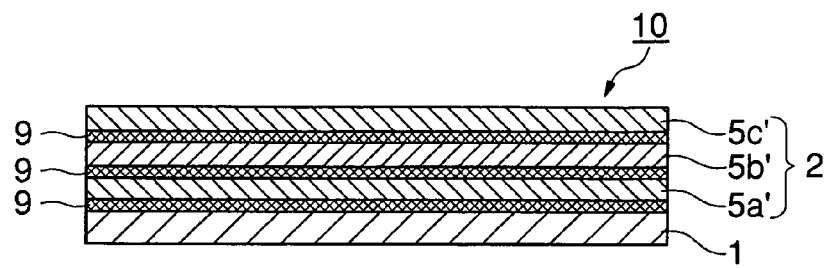
FIG. 6 is a diagrammatic sectional view showing a further example of the projection screen shown in FIG. 1.

In the case where the surface of the substrate 1 has aligning power, it is possible to control the orientation of the cholesteric liquid crystalline structure of the selective reflection layer (especially the selective reflection layer 5a' on the substrate 1 side) by providing an intermediate layer 9, such as an adherent layer, between the substrate 1 and the cholesteric liquid crystal layer serving as the selective reflection layer (especially the selective reflection layer 5a' on the substrate 1 side) in the projected-image-receiving layer 2, thereby directing, to a plurality of directions, the directors of liquid crystalline molecules constituting the cholesteric liquid crystalline structure of the selective reflection layer (especially the selective reflection layer 5a' on the substrate 1 side), existing in the vicinity of the intermediate layer 9. By providing the intermediate layer 9 such as an adherent layer, it is also possible to improve the adhesion between the selective reflection layer (especially the selective reflection layer 5a' provided on the substrate 1 side) in the projected-image-receiving layer 2 and the substrate 1. For such an intermediate layer 9, any material can be used as long as it is highly adherent to both the material for the selective reflection layer (especially the selective reflection layer 5a' on the substrate 1 side) and the material for the substrate 1, and it is possible to use commercially available materials. Specific examples of materials that can be used for the intermediate layer 9 include an adherent-layer-containing PET film A4100 manufactured by Toyobo Co., Ltd., Japan and adherent materials AC-X, AC-L and AC-W manufactured by Panack Co., Ltd., Japan. If necessary, the intermediate layer 9 such as an adherent layer may be provided between each neighboring two of the selective reflection layers 5a', 5b' and 5c' to be laminated to the substrate 1, as shown in FIG. 6.

In the case where the surface of the substrate 1 has no aligning power, and the adhesion between the selective reflection layer (especially the selective reflection layer 5a' on the substrate 1 side) in the projected-image-receiving layer 2 and the substrate 1 is satisfactorily high, it is not always required to provide the intermediate layer 9. To improve the adhesion between the selective reflection layer (especially the selective reflection layer 5a' on the substrate 1 side) and the substrate 1, a process-related method such as corona discharge treatment or UV cleaning may also be used.

Any material can be used for the substrate 1, and a material selected from plastic films, metals, paper, glass, and the like may be used. Examples of plastic films that can be used as materials for the substrate 1 include films of such thermoplastic polymers as polycarbonate polymers, polyester polymers including polyacrylate and polyethylene terephthalate, polyimide polymers, polysulfone polymers, polyether sulfone polymers, polystyrene polymers, polyolefin polymers including polyethylene and polypropylene, polyvinyl alcohol polymers, cellulose acetate polymers, polyvinyl chloride polymers, and polymethyl methacrylate polymers.

The thickness of the substrate 1 should be properly selected according to the intended use and type of the projection screen 10. For example, to make the projection screen 10 windable, the thickness of the substrate 1 is made preferably from 15 to 300 μm, more preferably from 25 to 100 μm. On the other hand, to produce a panel-type projection screen 10 that requires no flexibility, the thickness of the substrate 1 can be made great limitlessly.

In the projection screen 10 comprising the above-described projected-image-receiving layer 2 and substrate 1, the projected-image-receiving layer 2 has the function of selectively reflecting only a specific polarized-light component (e.g., right-handed circularly polarized light), so that this layer 2 can be made to reflect only approximately 50% of the unpolarized environmental light, such as sunlight and light from lighting fixtures, incident on this layer. For this reason, while maintaining the brightness of the light-indication part such as a white-indication part, it is possible to lower the brightness of the dark-indication part such as a black-indication part to nearly half, thereby obtaining nearly twice-enhanced image contrast. In this case, if the imaging light to be projected is made to mainly contain a polarized-light component that is identical with the polarized-light component which the projected-image-receiving layer 2 selectively reflects (e.g., right-handed circularly polarized light), the projected-image-receiving layer 2 can reflect nearly 100% of reflecting a specific polarized-light component, possessed by the projected-image-receiving layer 2, and also to diffuse, without lowering image visibility, the imaging light that is reflected, because of the function of diffusing the specific polarized-light component, possessed by the projected-image-receiving layer 2. The projection screen 10 can, therefore, sharply display an image even under bright environmental light. Further, according to the above-described projection screen 10, the selective reflection layers (the selective reflection layers 5a, 5b and 5c, or the selective reflection layers 5a', 5b' and 5c') constituting the projected-image-receiving layer 2 are successively laminated, the selective reflection layer to be situated on the substrate 1 side being firstly formed, in such a manner that their reflection wave ranges successively cover from the shorter to longer wavelength side. Therefore, even when the thickness of each selective reflection layer is controlled so that the selective reflection layers have the same reflection efficiency, the projected-image-receiving layer 2 is to have not so increased overall thickness. For this reason, the function of selectively reflecting a specific polarized-light component and the resistance to bending that are possessed by the projection-image-receiving layer 2 are not impaired.

Figure 7:
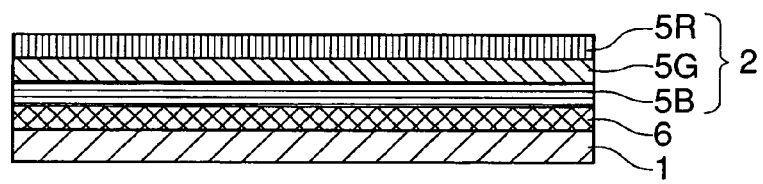
FIG. 7 is a diagrammatic sectional view showing a still further example of the projection screen shown in FIG. 1.

The construction of the projection screen 10 is not limited to the above-described one; any construction is possible as long as the projected-image-receiving layer 2 is provided on the substrate 1, and any other proper layers may be added. Specifically, for example, on the substrate 1 may be formed an adhesion-improving layer 6, on which the projected-image-receiving layer 2 is formed, as shown in FIG. 7. The adhesion-improving layer 6 is for increasing the adhesion between the substrate 1 and the projected-image-receiving layer 2, and any type of materials including acrylic or epoxy materials can be used for this layer. In the projected-image-receiving layer 2 shown in FIG. 7, three selective reflection layers, that is, a blue selective reflection layer 5B having a reflection wave range covering the shortest wavelength side, a green selective reflection layer 5G, and a red selective reflection layer 5R, are successively laminated to the substrate 1 in the order mentioned. However, the order in which the selective reflection layers are laminated is not limited to the above-described one; they may be laminated in any other order in consideration of, for example, the wavelength at which the reflection intensity peaks, and selective reflection layers of other colors may also be provided, as needed.

Although the above embodiment is described by referring to the case where the substrate 1, a component of the projection screen 10, is an absorptive substrate containing a light-absorbing layer that absorbs light in the visible region, the substrate 1 may also be a transparent substrate capable of transmitting at least part of light in the visible region. If a transparent substrate is used, although the advantage of enhancing image contrast is lost, the projection screen 10 is highly transparent when not displaying an image, and the background can thus be clearly seen through the projection screen 10. Therefore, such a projection screen 10 can be conveniently used in decorative applications; for example, it is fit for use on a show window. Moreover, by switching the viewing angle according to the situation, it is possible to produce a more effective eye-catching effect. For this reason, the projection screen 10 using a transparent substrate can overcome the drawback of conventional information tools using projectors that they are not attractive in bright environments, and can effectively be used in such applications as billboards, bulletin boards, and guideboards. Although the transparent substrate is preferably less hazy, any material selected from acrylic resins, glass, vinyl chloride resins, etc. may be used for the transparent substrate as long as it can transmit light. Further, the transparent substrate is not necessarily colorless, and a colored one may also be used. Specifically, for example, it is possible to use transparent plastic or glass plates in a color of brown, blue, orange, or the like that are usually used for partition walls, windows, and so forth.

Further, in the above-described projection screen 10, an intermediate layer 9 having adhesion properties (an adherent layer) may be provided between the projected-image-receiving layer 2 and the substrate 1, or between each neighboring two of the selective reflection layers constituting the projected-image-receiving layer 2. The intermediate layer 9 may have barrier properties in addition to (or in place of) the adhesion properties. The barrier properties herein mean the following action: when a selective reflection layer is laminated directly to a substrate, or when one selective reflection layer is laminated directly to another selective reflection layer, the constituents of the lower layer are prevented from migrating to (permeating through) the upper layer, or the constituents of the upper layer are prevented from migrating to (permeating through) the lower layer. If substances migrate between the upper and lower layers, the optical properties (wavelength selectivity, polarization selectivity, diffusing properties, etc.) inherent in the selective reflection layer that serves as the upper or lower layer are impaired. However, this can be prevented by the use of the above-described intermediate layer having barrier properties (a barrier layer). Specifically, for example, in the case where a selective reflection layer is laminated to another selective reflection layer by applying a cholesteric liquid crystalline composition, a nematic liquid crystal component contained in the liquid crystalline composition for forming the upper selective reflection layer can permeate through the lower selective reflection layer to change (increase) the helical pitch in the lower selective reflection layer. Even in this case, if a barrier layer is provided between the lower and upper selective reflection layers, the migration (permeation) of the nematic liquid crystal component does not occur, and the optical properties (wavelength selectivity, polarization selectivity, diffusing properties, etc.) of the selective reflection layers are successively maintained.

Examples of materials that can be used for forming such a barrier layer include modified acrylates, urethane acrylates, polyester acrylates, and epoxy resins. These compounds may be either monofunctional or polyfunctional and include monomers and oligomers. Specific examples of these compounds include ethoxylated trimethylolpropane triacrylate, propoxylated glyceryl triacrylate, pentaerythritol tetraacrylate, ditrimethylolpropane tetraacrylate, dipentaerythritol hydroxypentaacrylate, ethoxylated pentaerythritol tetraacrylate, pentaacrylic ester, pentaerythritol triacrylate, trimethylolpropane triacrylate, trimethylolpropane PO-modified triacrylate, isocyanuric acid EO-modified triacrylate, trimethylolpropane EO-modified triacrylate, dipentaerythritol penta- or hexa-acrylate, urethane adducts, aliphatic polyamine epoxy resins, polyaminoamide epoxy resins, aromatic diamine epoxy resins, alicyclic diamine epoxy resins, phenolic epoxy resins, amino epoxy resins, mercaptan epoxy resins, dicyandiamide epoxy resins, and Lewis acid complex epoxy resins.

Figure 8:
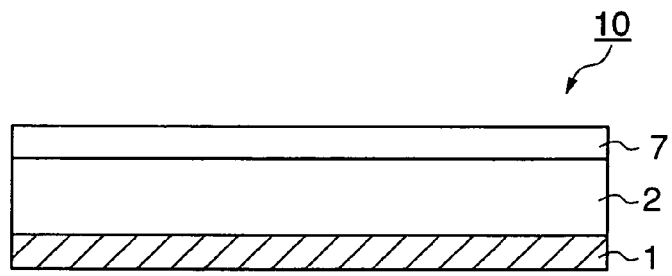
FIG. 8 is a diagrammatic sectional view showing a yet further example of the projection screen shown in FIG. 1.

Furthermore, in the above-described projection screen 10, a functional layer 7 may be provided on the observation side surface of the projected-image-receiving layer 2, as shown in FIG. 8. A variety of layers including a hard coat (HC) layer, an anti-glaring (AG) layer, an anti-reflection (AR) layer, an ultraviolet-light-absorbing (UV-absorbing) layer, and an antistatic (AS) layer can be used as the functional layer 7.

The hard coat (HC) layer is for protecting the surface of the projection screen 10 and preventing it from being scratched or staining. The anti-glaring (AG) layer is for preventing the projection screen 10 from glaring. The anti-reflection (AR) layer is for preventing the surface of the projection screen 10 from reflecting light. The ultraviolet-light-absorbing (UV-absorbing) layer is for absorbing the ultraviolet light component of light incident on the projection screen 10, the UV component causing yellowing of the liquid crystalline composition. The antistatic (AS) layer is for removing static electricity that is generated in the projection screen 10. In the case where the antistatic layer is used as the functional layer 7, this layer is not always provided on the observation side surface of the projected-image-receiving layer 2, and may be provided on the back surface of the substrate 1. Moreover, carbon particles or the like may be incorporated in the substrate 1, thereby imparting, to the substrate 1 itself, the property of removing static electricity.

The functional layer 7 serving as an anti-glaring layer has the property of preventing the surface of the projection screen 10 from mirroring viewers and their surroundings, and is significant for clear image recognition. A transparent layer with a roughened surface is preferably used as the anti-glaring layer, and by the use of such a layer, it becomes possible to effectively prevent mirroring of objects that occurs on the surface of the projection screen 10 because of interfacial reflection. Such a transparent layer can be obtained by roughening the surface of a transparent resin, glass, or the like by such a method as sandblasting, transfer of the shape of a molding surface, or chemical treatment. The surface of a transparent layer may be roughened either irregularly or regularly. To maintain the polarized-light-separating property of the projected-image-receiving layer 2, it is preferable that the anti-glaring layer be isotropic with respect to refractive index. Examples of materials useful for the anti-glaring layer include glass, resins such as acrylic resins and polyester resins, and TAC (triacetyl cellulose) films with matte surfaces.

Figure 9:
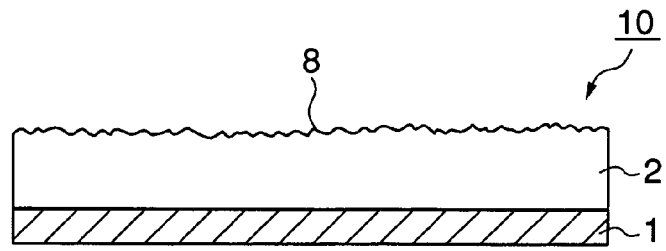
FIG. 9 is a diagrammatic sectional view showing another example of the projection screen shown in FIG. 1.

Instead of providing, separately from the projected-image-receiving layer 2, the functional layer 7 serving as an anti-glaring layer to impart the anti-glaring property to the projection screen 10, as shown in FIG. 8, the observation side surface of the projected-image-receiving layer 2 may be roughened (see reference numeral 8), as shown in FIG. 9, thereby imparting the anti-glaring property to the projected-image-receiving layer 2 itself.

Projection System

The above-described projection screen 10 can be incorporated into a projection system comprising a projector 3 for projecting imaging light on the projection screen 10, as shown in FIG. 1.

Although the projector 3 may be of any type as long as the light projected from the projector can cause light and shade to produce an image on the projection screen 10, it is preferable to use a projector of self-emission type such as a CRT projector, or a projector of light-bulb type such as a liquid crystal or DLP (digital light processing) projector. Besides, a projector producing an image with a film or the like placed in front of a light source, like a cinema projector, may also be used as the projector 3.

The projector 3 often emits unpolarized or linearly polarized light, and it is preferable to convert the unpolarized or linearly polarized light into circularly polarized light, as needed. Specifically, because of its operating principle, a liquid crystal projector useful as the projector 3 usually emits light that is polarized substantially linearly. In this case, by letting the imaging light from the projector 3 emerge through a retardation layer or the like, it is possible to convert the linearly polarized light into circularly polarized light without causing the loss of the amount of light. A quarter wave plate is herein preferably used as the retardation layer. Specifically, an ideal retardation layer is one capable of causing a phase shift of 137.5 nm for light of 550 nm whose visibility is highest. Further, a wide-wave-range quarter wave plate is more preferable because it is applicable to light in all of the red (R), green (G) and blue (B) color wave ranges. It is also possible to use a single retardation layer that can be obtained by controlling the birefringence of a material for this layer, or a retardation layer using a quarter wave plate in combination with a half wave plate. Such a retardation layer may be externally attached to the exit aperture of the projector 3, or internally placed in the projector 3.

When a CRT or DLP projector is used as the projector 3, since the projector 3 emits unpolarized light, it is necessary to use a circular polarizer composed of a linear polarizer and a retardation layer in order to convert the unpolarized light into circularly polarized light. If such a circular polarizer is used, although the amount of light emitted from the projector 3 itself is decreased to half, it is possible to effectively prevent the production of stray light or the like from a polarized-light component (e.g., left-handed circularly polarized light) that is different from the polarized-light component which the projected-image-receiving layer 2 in the projection screen 10 selectively reflects, thereby enhancing image contrast. In the case where linearly polarized light is produced by an optical system incorporated into the projector 3, only a retardation layer may be used without using a linear polarizer.

Preferably, environmental light such as light from lighting fixtures that illuminates a room in which the projection screen 10 is used is made to mainly contain a polarized-light component (e.g., left-handed circularly polarized light) that is different from the polarized-light component which the projection screen 10 selectively reflects. By so making the environmental light, the projection screen 10 does not reflect the environmental light incident on it and absorbs most of the light, so that it can provide improved image contrast even under bright environmental light. In this case, an absorption circular polarizer, or a reflection circular polarizer using a circularly- or linearly-polarized-light-separating layer may be used for controlling the state of polarization of the environmental light such as light from lighting fixtures.

The present invention is not limited to the aforementioned embodiments, which are to be considered in all respects as illustrative and not restrictive. The scope of the invention is indicated by the appended claims rather than by the foregoing description, and all changes that come within the meaning and range of equivalency of the claims are therefore embraced in the scope of the invention.

EXAMPLES

A specific example of the above-described embodiments will now be given below.

Example

A first cholesteric liquid crystal solution having a selective reflection wave range with a center wavelength of 440 nm was prepared by dissolving, in cyclohexanone, a monomer-containing liquid crystal consisting of a main component that was an ultraviolet-curing, nematic liquid crystal (94.7% by weight) and a polymerizable chiral agent (5.3% by weight).

A liquid crystal containing a compound represented by the above chemical formula (12) was used as the nematic liquid crystal.

A compound represented by the above chemical formula (15) was used as the polymerizable chiral agent.

To the first cholesteric liquid crystal solution was added 5% by weight of a photopolymerization initiator available from Ciba Specialty Chemicals K.K., Japan.

By a bar coating method, the above-prepared first cholesteric liquid crystal solution was applied to a substrate, a 200-mm□ (200 mm×200 mm) black-colored PET film coated with an adherent layer (Lumirror/AC-X manufactured by Panack Co., Ltd., Japan).

This substrate was heated in an oven at 80° C. for 90 seconds, thereby conducting aligning treatment (drying treatment). Thus, a cholesteric liquid crystal layer containing no solvent was obtained.

Thereafter, 50 mW/cm$^2$ of ultraviolet light with a wavelength of 365 nm was applied to this cholesteric liquid crystal layer for 1 minute for curing, thereby obtaining a first selective reflection layer having a selective reflection wave range with a center wavelength of 440 nm.

Similarly, a second cholesteric liquid crystal solution was applied directly to the first selective reflection layer and then subjected to aligning treatment (drying treatment) and curing treatment. Thus, a second selective reflection layer having a selective reflection wave range with a center wavelength of 550 nm was obtained. The procedure used for preparing the second cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 550 nm.

Similarly, a third cholesteric liquid crystal solution was applied directly to the second selective reflection layer and then subjected to aligning treatment (drying treatment) and curing treatment. Thus, a third selective reflection layer having a selective reflection wave range with a center wavelength of 600 nm was obtained. The procedure used for preparing the third cholesteric liquid crystal solution was the same as the procedure used for preparing the first cholesteric liquid crystal solution, provided that the nematic liquid crystal and the chiral agent were mixed in such a proportion that the resulting layer had a selective reflection wave range with a center wavelength of 600 nm.

Thus, there was obtained a projection screen comprising a projected-image-receiving layer composed of the three selective reflection layers, that is, the first selective reflection layer for selectively reflecting light in the wave range for blue (B) color (light in the wave range identical with the selective reflection wave range with a center wavelength of 440 nm), the second selective reflection layer for selectively reflecting light in the wave range for green (G) color (light in the wave range identical with the selective reflection wave range with a center wavelength of 550 nm), and the third selective reflection layer for selectively reflecting light in the wave range for red (R) color (light in the wave range identical with the selective reflection wave range with a center wavelength of 600 nm) that were successively laminated to the substrate in the order mentioned. The thickness of the first selective reflection layer was made 4 µm [(the thickness of the layer)/(the center wavelength of the selective reflection wave range)=9.1]; the thickness of the second selective reflection layer was made 3 µm [(the thickness of the layer)/(the center wavelength of the selective reflection wave range)=5.5]; and the thickness of the third selective reflection layer was made 3.5 µm [(the thickness of the layer)/(the center wavelength of the selective reflection wave range)=5.8]. The cholesteric liquid crystalline structures of the selective reflection layers constituting the projected-image-receiving layer in the projection screen thus obtained were not in the state of planar orientation.

Comparative Example

A commercially available screen (manufactured by OS Co., Ltd., Japan), a cloth coated with a beads-containing scattering layer, was prepared as a projection screen of Comparative Example.

(Results of Evaluation)

Imaging light emitted from a projector was projected on the projection screens of Example and Comparative Example, thereby measuring the image contrast.

A circular polarizer was attached to the exit aperture of the projector in order to convert the imaging light emitted from the projector into circularly polarized light. A fluorescent lamp (emitting unpolarized light) fixed to the ceiling was used to illuminate the room in which the projector and the projection screen were placed. The projection screen and the fluorescent lamp were so arranged that the light from the fluorescent lamp entered the projection screen at an angle of 50 degrees. The illuminance right under the projection screen, measured by an illuminometer (a digital illuminometer "510-02" manufactured by Yokogawa M & C CO., Ltd., Japan), was 200 lx.

The projection screen was set vertically to the floor. The projector was placed vertically to the projection screen, in parallel with the floor, at a point approximately 2.5 m distant from the projection screen.

Imaging light (a still image including white and black parts) was projected on the projection screen from the projector, and the image contrast was determined. Specifically, the luminances of the white and black parts of the image in the center of the projection screen were measured by a luminance meter "BM-8" manufactured by Topcon Corp., Japan, and the ratio between these two luminances was obtained as the image contrast [contrast=(luminance of white part)÷(luminance of black part)].

The contrast values of the images projected on the projection screen of Example and that of Comparative Example are shown in Table 1. The contrast of the image displayed on the projection screen of Example was approximately 8 times higher than that of the image displayed on the projection screen of Comparative Example. Moreover, the image displayed on the projection screen of Example had a good balance of red, green and blue colors, and white color was excellently displayed.

TABLE 1

|  | Example | Comparative Example |
|---|---|---|
| Contrast | 30 | 4 |

What is claimed is:

1. A projection screen for displaying an image by reflecting imaging light that is projected from an observation side, the projection screen comprising:
   a projected-image-receiving layer having a function of selectively reflecting a specific polarized-light component and a function of diffusing the specific polarized-light component,
   wherein the projected-image-receiving layer includes two or more selective reflection layers having the function of selectively reflecting the specific polarized-light component, the two or more selective reflection layers have different reflection wave ranges, and, of the two or more selective reflection layers, the selective reflection layer having a reflection wave range covering a shorter wavelength side is situated apart from the observation side as compared with the selective reflection layer having a reflection wave range covering a longer wavelength side,
   wherein a value obtained by dividing a thickness of each selective reflection layer in the projected-image-receiving layer by a center wavelength of a reflection wave range thereof, the center wavelength being determined on an assumption that light enters the selective reflection layer vertically to it, fulfills a requirement that this value obtained in terms of the selective reflection layer having a reflection wave range covering the shorter wavelength side is greater than that obtained in terms of the selective reflection layer having a reflection wave range covering the longer wavelength side.

2. The projection screen according to claim 1, wherein the two or more selective reflection layers in the projected-image-receiving layer are a selective reflection layer having a reflection wave range with a center wavelength of 430 to 460 nm, a selective reflection layer having a reflection wave range with a center wavelength of 540 to 570 nm, and a selective reflection layer having a reflection wave range with a center wavelength of 580 to 620 nm, provided that light enters the projected-image-receiving layer vertically to it.

3. The projection screen according to claim 1, wherein the specific polarized-light component is right- or left-handed circularly polarized light.

4. The projection screen according to claim 1, wherein the specific polarized-light component is linearly polarized light of one vibration direction.

5. The projection screen according to claim 1, wherein the projected-image-receiving layer further includes, in addition to the two or more selective reflection layers having the function of selectively reflecting the specific polarized-light component, a diffusing layer having the function of diffusing the specific polarized-light component.

6. The projection screen according to claim 1, wherein each selective reflection layer in the projected-image-receiving layer has, in addition to the function of selectively reflecting the specific polarized-light component, the function of diffusing the specific polarized-light component.

7. The projection screen according to claim 6, wherein each selective reflection layer in the projected-image-receiving layer has a cholesteric liquid crystalline structure, and, owing to structural non-uniformity in the cholesteric liquid crystalline structure, diffuses the specific polarized-light component.

8. The projection screen according to claim 1, further comprising a substrate that supports the projected-image-receiving layer.

9. The projection screen according to claim 8, wherein the substrate is an absorptive substrate containing a light-absorbing layer capable of absorbing light in a visible region.

10. The projection screen according to claim 8, wherein the substrate is a transparent substrate capable of transmitting at least part of light in a visible region.

11. The projection screen according to claim 1, further comprising an intermediate layer having a barrier property, provided between each neighboring two of the selective reflection layers in the projected-image-receiving layer.

12. The projection screen according to claim 1, further comprising an intermediate layer having an adhesion property, provided between each neighboring two of the selective reflection layers in the projected-image-receiving layer.

13. The projection screen according to claim 1, further comprising a functional layer that contains at least one layer selected from a group consisting of a hard coat layer, an anti-glaring layer, an anti-reflection layer, an ultraviolet-light-absorbing layer, and an antistatic layer.

14. The projection screen according to claim 13, wherein the functional layer is an anti-glaring layer composed of a layer with an irregularly roughened surface, isotropic with respect to refractive index.

15. The projection screen according to claim 14, wherein the anti-glaring layer is a TAC film with a matte surface.

16. The projection screen according to claim 1, wherein the projected-image-receiving layer has, on a side on which imaaing light is projected, a roughened surface by which an anti-glaring property is imparted to the projected-image-receiving layer.

17. A projection system comprising:
    the projection screen according to claim 1; and
    a projector that projects imaging light on the projection screen.

18. A projection screen for displaying an image by reflecting imaging light that is projected from an observation side, the projection screen comprising:
    a projected-image-receiving layer having a function of selectively reflecting a specific polarized-light component and a function of diffusing the specific polarized-light component,
    wherein the projected-image-receiving layer includes two or more selective reflection layers having the function of selectively reflecting the specific polarized-light component, the two or more selective reflection layers have different reflection wave ranges, and, of the two or more selective reflection layers, the selective reflection layer having a reflection wave range covering a shorter wavelength side is situated apart from the observation side as compared with the selective reflection layer having a reflection wave range covering a longer wavelength side, and
    an intermediate layer having a barrier property, provided between each neighboring two of the selective reflection layers in the projected-image-receiving layer.

* * * * *